(12) United States Patent
Weaver et al.

(10) Patent No.: US 6,787,589 B2
(45) Date of Patent: Sep. 7, 2004

(54) AMBER POLYESTER COMPOSITIONS AND CONTAINER ARTICLES PRODUCED THEREFROM

(75) Inventors: Max Allen Weaver, Kingsport, TN (US); Marc Alan Strand, Kingsport, TN (US); Crystal Leigh Kendrick, Kingsport, TN (US); Gerry Foust Rhodes, Piney Flats, TN (US); Gertrude Williams, Blountville, TN (US); Jason Clay Pearson, Kingsport, TN (US); Timothy Alan Upshaw, Kingsport, TN (US)

(73) Assignee: Eastman Chemical Company, Kingsport, TN (US)

(*) Notice: Subject to any disclaimer, the term of this patent is extended or adjusted under 35 U.S.C. 154(b) by 4 days.

(21) Appl. No.: 10/284,592

(22) Filed: Oct. 31, 2002

(65) Prior Publication Data

US 2004/0087688 A1 May 6, 2004

(51) Int. Cl.$^7$ .......................... C08L 67/02; C08K 5/42; C08K 5/3447; C08K 5/18; C08K 5/16
(52) U.S. Cl. .......................... 523/508; 524/87; 524/88; 524/90; 524/157; 524/159; 524/207; 524/208; 524/718; 524/720; 524/722; 525/10; 525/437; 525/445; 528/289; 528/290; 528/292
(58) Field of Search .......................... 523/508; 524/87, 524/88, 90, 157, 159, 207, 208; 525/10, 437, 445; 528/289, 290, 292

(56) References Cited

U.S. PATENT DOCUMENTS

| | | | |
|---|---|---|---|
| 4,025,492 A | 5/1977 | Binsack et al. | |
| 4,082,721 A | 4/1978 | Kok et al. | |
| 4,136,089 A | 1/1979 | Bier et al. | |
| 4,176,224 A | 11/1979 | Bier et al. | |
| 4,238,593 A | 12/1980 | Duh | |
| 4,359,570 A | 11/1982 | Davis et al. | |
| 4,521,556 A | 6/1985 | Adams | |
| 4,617,373 A | 10/1986 | Pruett et al. | |
| 4,617,374 A | 10/1986 | Pruett et al. | |
| 4,654,399 A | * 3/1987 | Callander et al. | ........... 524/720 |
| 4,707,537 A | 11/1987 | Pruett et al. | |
| 4,745,173 A | 5/1988 | Weaver et al. | |
| 4,749,773 A | 6/1988 | Weaver et al. | |
| 4,749,774 A | 6/1988 | Weaver et al. | |
| 4,749,779 A | 6/1988 | Rosenquist | |
| 4,845,187 A | 7/1989 | Weaver et al. | |
| 4,999,418 A | 3/1991 | Krutak et al. | |
| 5,106,942 A | 4/1992 | Krutak et al. | |
| 5,532,332 A | 7/1996 | Weaver et al. | |
| 5,650,481 A | 7/1997 | Yau et al. | |
| 5,688,899 A | 11/1997 | Strand et al. | |
| 5,744,571 A | 4/1998 | Hilbert et al. | |
| 5,955,564 A | 9/1999 | Weaver et al. | |

OTHER PUBLICATIONS

R.E. Wilfong, "Linear Polyesters," Journal of Polymer Science, 1961, pp. 385–410, vol. 54.

J. Templar, K. Arrigan, and W.K. Simpson, Formation, Measurement and Significance of Lightstruck Flavor in Beer: A Review, Brewer's Digest, 1985, pp. 18–25, vol. 70, No. 5.

V. Biundo, "Specifying Amber Glass Color in Order to Protect Beer from Developing Lightstruck Character," Brewer's Association of America Technical Quarterly, 2000, pp. 223–238, vol. 37, No. 2.

* cited by examiner

Primary Examiner—Matthew A. Thexton
(74) Attorney, Agent, or Firm—Dennis V. Carmen; Bernard J. Graves, Jr.

(57) ABSTRACT

This application discloses amber colored polyesters suitable for packaging food and beverages. The amber polyester compositions provide excellent blockage of UV and visible light over the wavelength ranges of from about 320–550 nm, rendering them suitable for packaging materials sensitive to ultraviolet and visible light over this wavelength range, particularly beer.

24 Claims, 7 Drawing Sheets

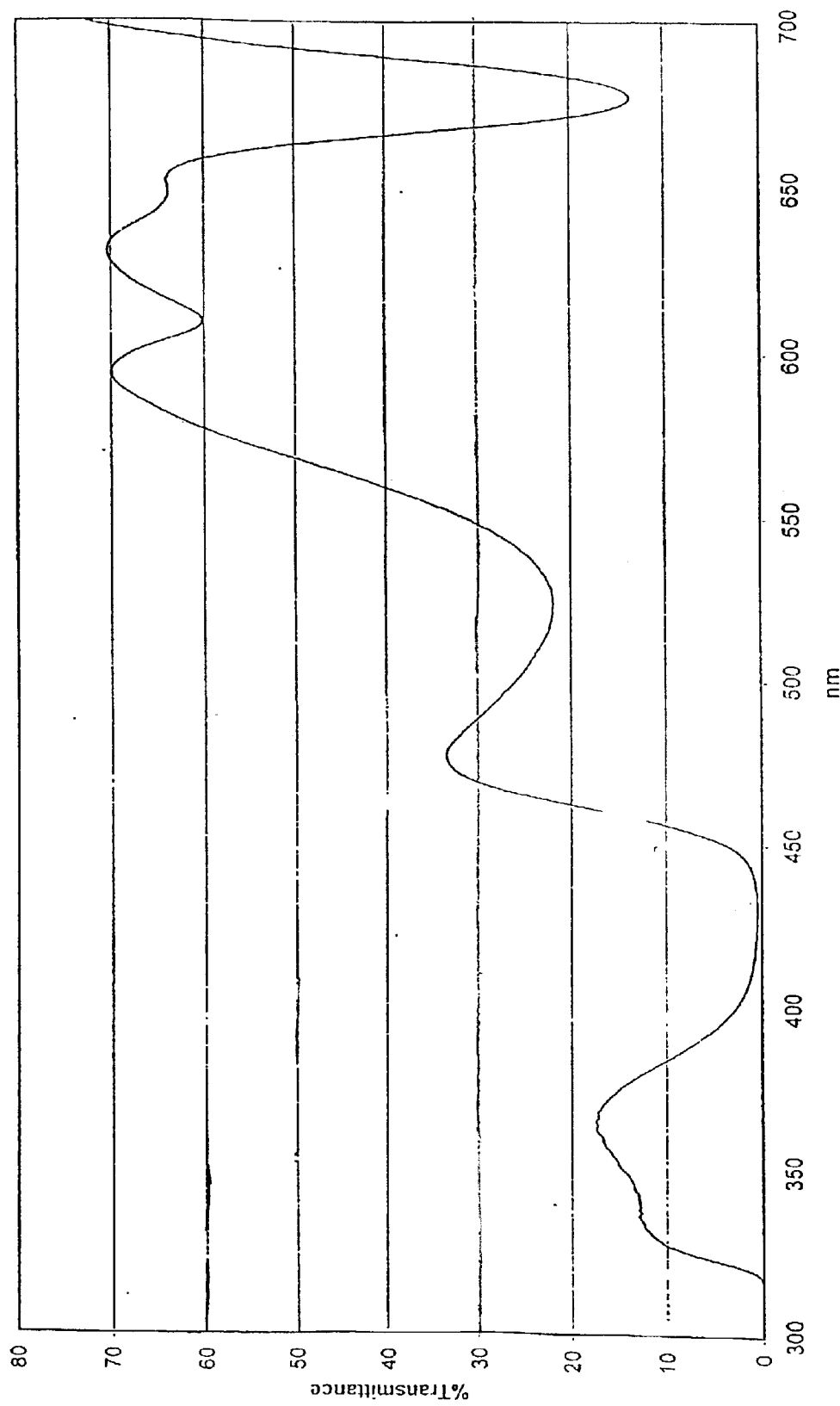
Figure I
Transmission Spectrum of Amber Polyester of Comparative Example 1 (15 mil Film)
US Patent 4,617,373, Ex. 761

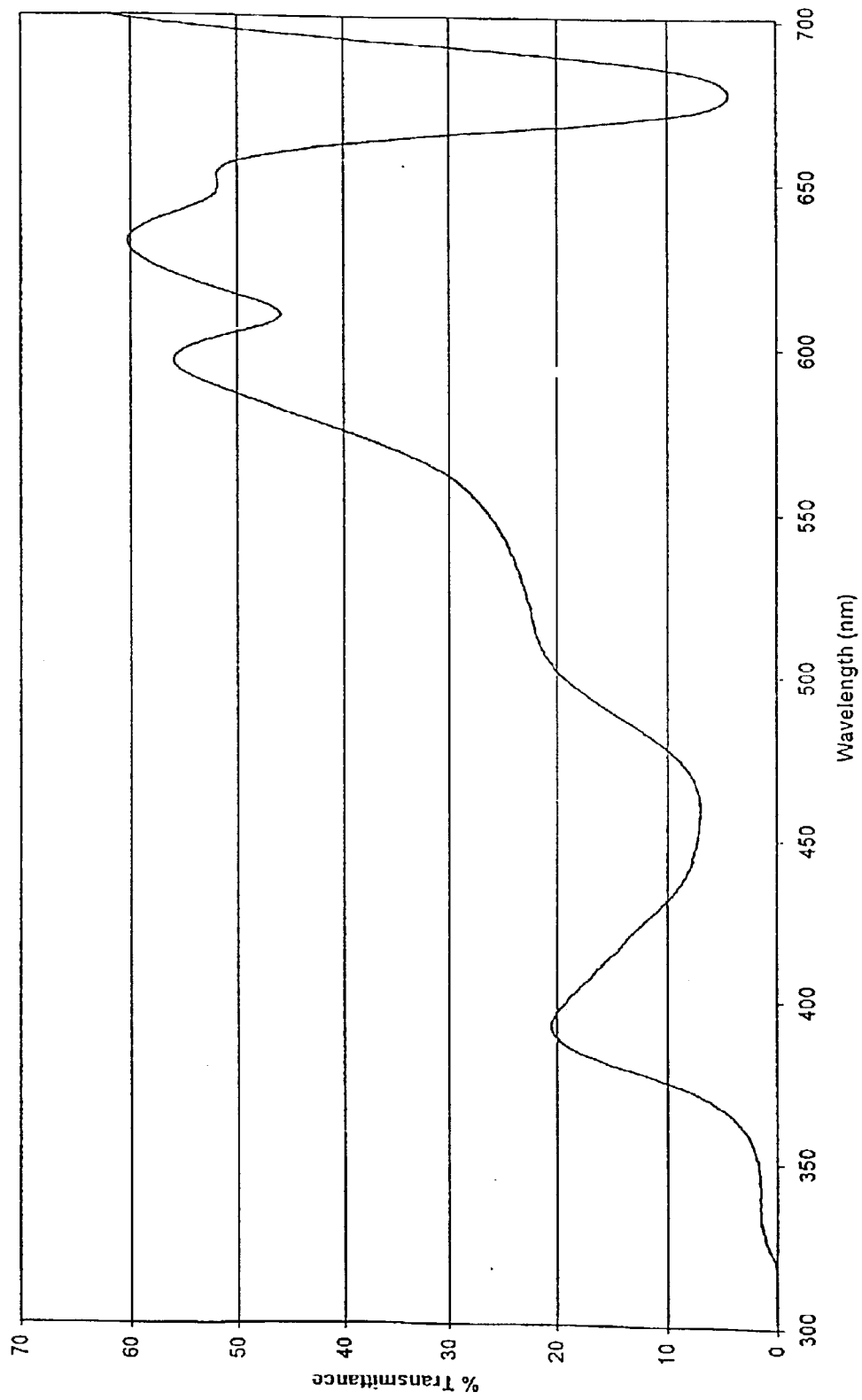
Figure II
Transmission Spectrum of Amber Polyester of Comparative Example 2 (16 mil film)
US Patent 4,521,556, Example 4

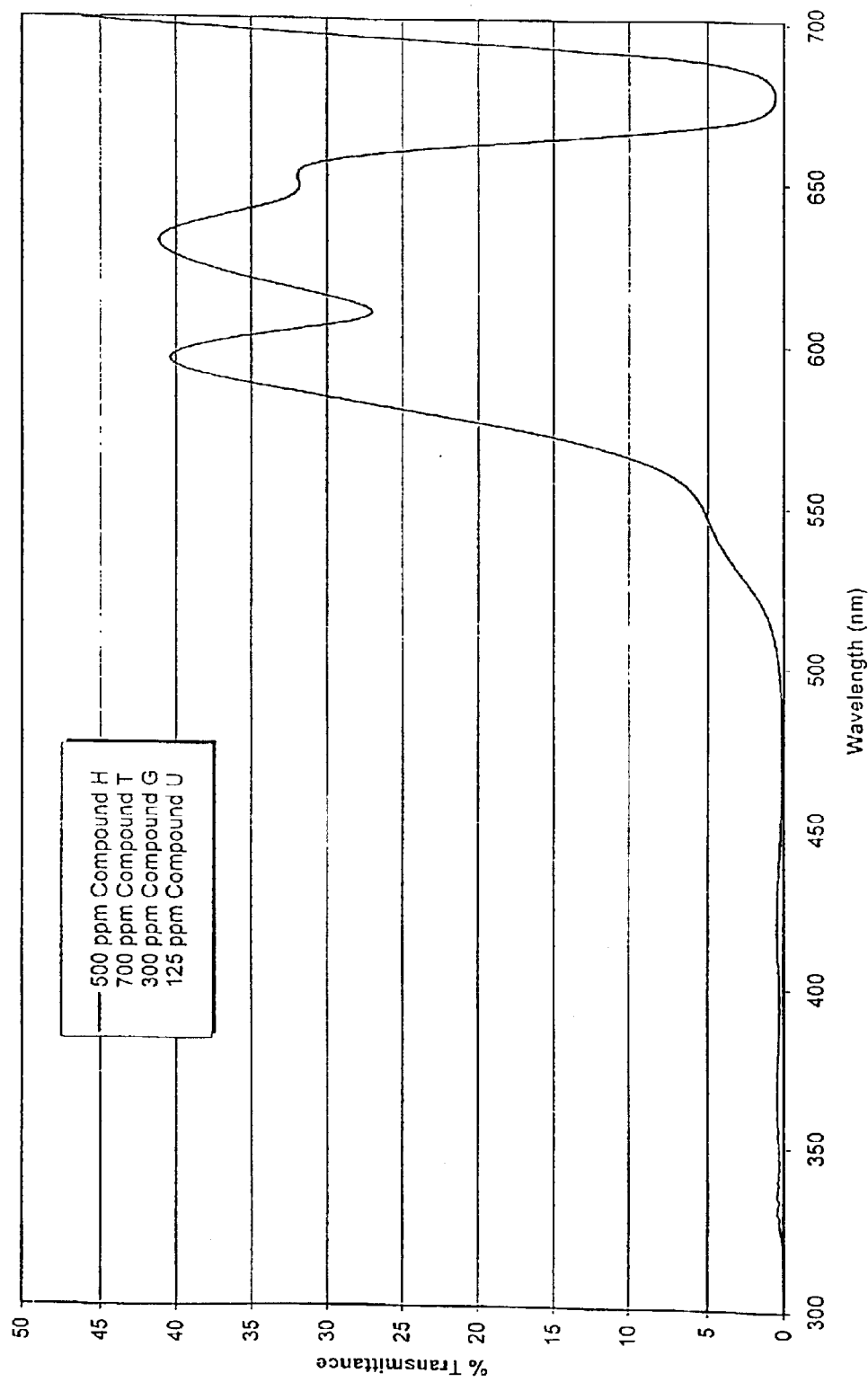
Figure III
Transmission Spectrum of the Amber Polyester of Example 7
(15 mil Film)

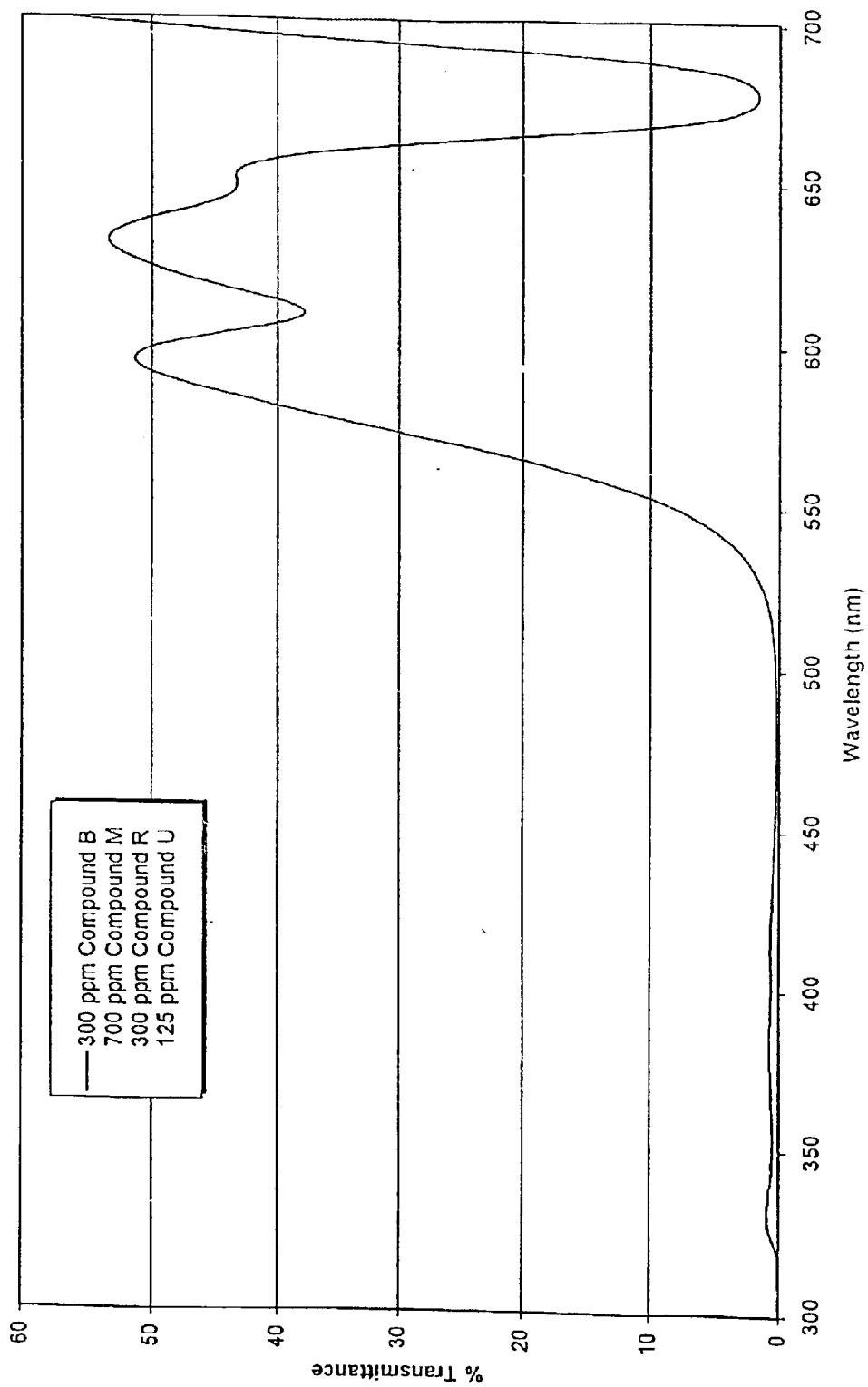
Figure IV
Transmission Spectrum of the Amber Polyester of Example 8
(14 mil Film)

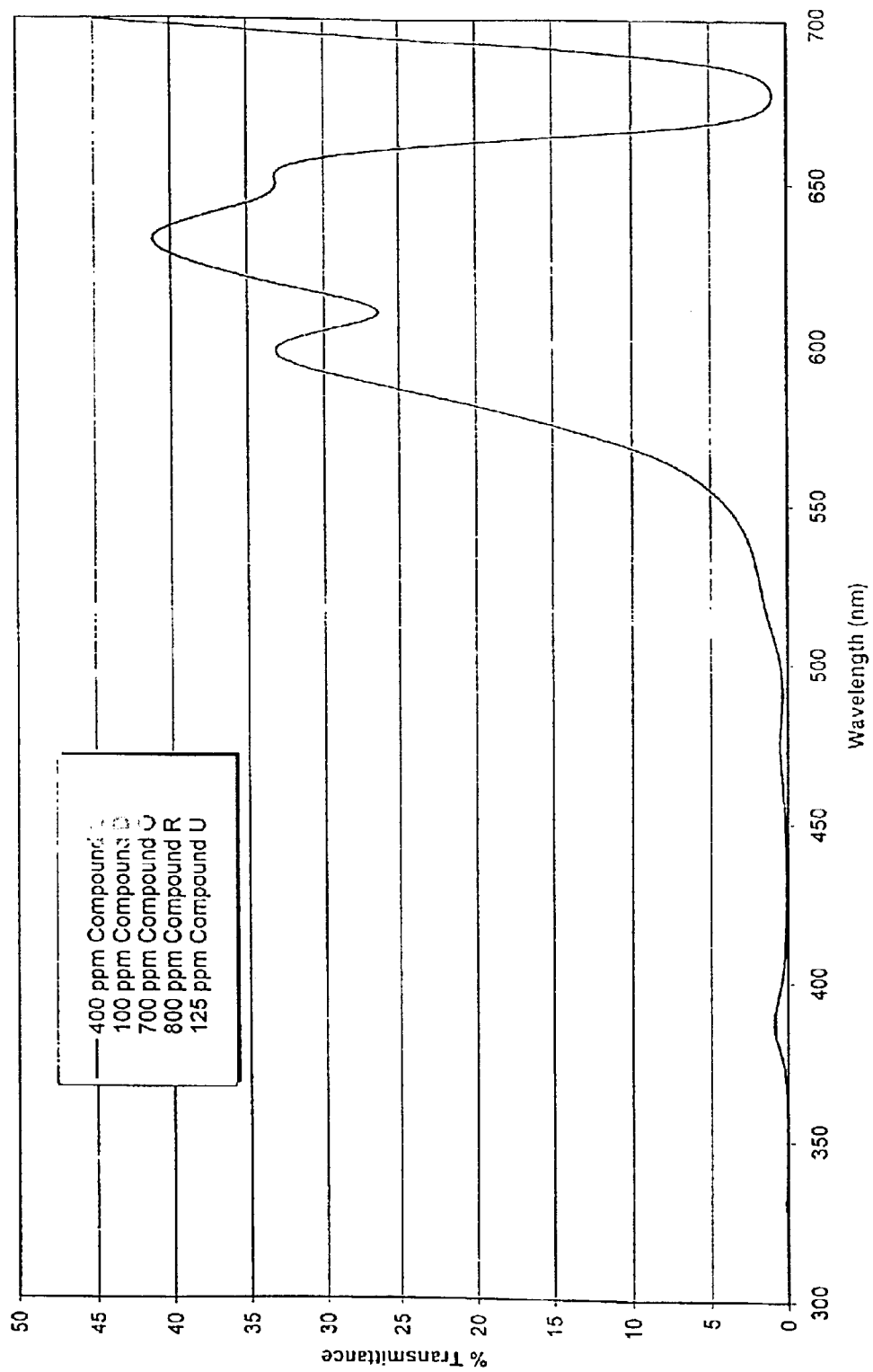

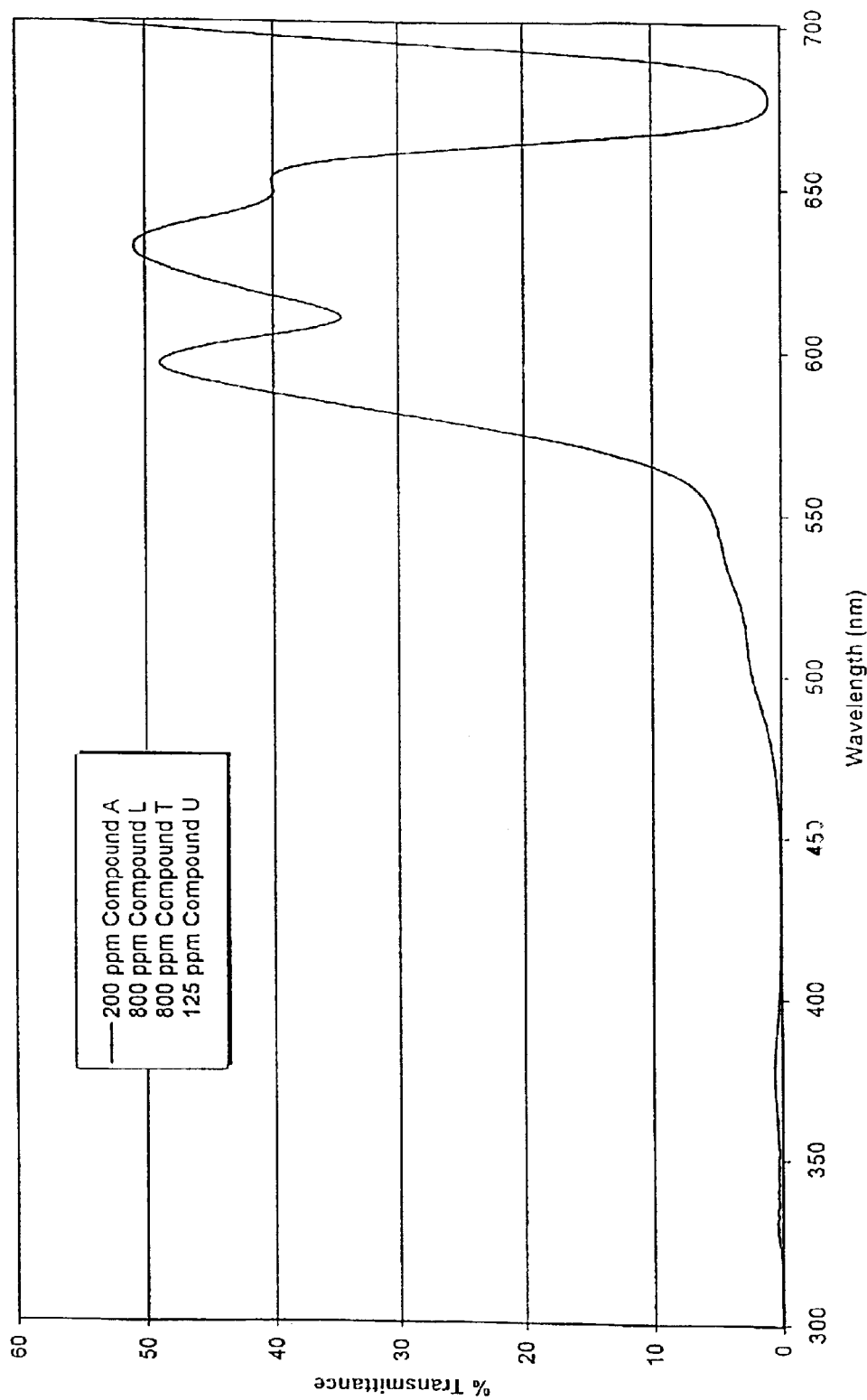

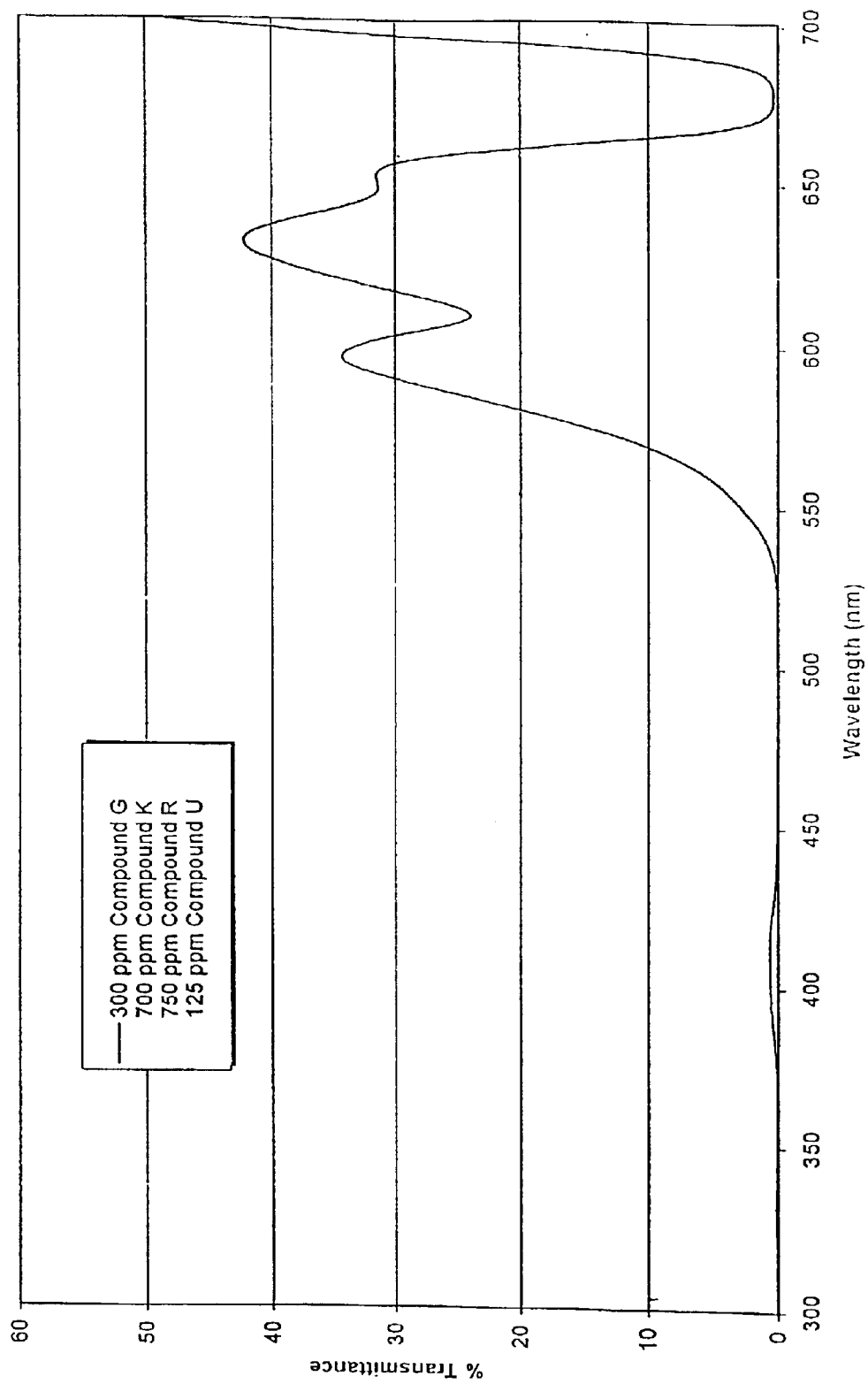
Figure VII
Transmission Spectrum of the Amber Polyester of Example II
(14 mil Film)
— 300 ppm Compound G
700 ppm Compound K
750 ppm Compound R
125 ppm Compound U

AMBER POLYESTER COMPOSITIONS AND CONTAINER ARTICLES PRODUCED THEREFROM

FIELD OF THE INVENTION

This invention pertains to amber polyester compositions which are suitable for producing containers for food and beverages wherein blockage of ultraviolet and visible light is important. More specifically, this invention pertains to amber polyester compositions capable of absorbing significantly light of wavelengths shorter than about 550 nanometers (nm), which is achieved by a novel combination of a plurality of colorants, some of which may be copoylmerized into the polyester.

BACKGROUND OF THE INVENTION

Polymers useful in the manufacture of containers for beverages and food in must possess a challenging combination of properties and technical specifications. For example, for containers intended for the packaging of carbonated beverages, the polymers used to produce the containers must prevent an excessive loss of carbonation through the walls of the container and must limit the ingress of oxygen to a very low level. Also, with some foods and beverages it is very desirable to protect them from ultraviolet light (UV) and some wavelengths of visible light.

The provision of polyester compositions useful for the manufacture of containers for beer is particularly challenging. Although a few beers are specifically treated to be resistant to light-induced changes, most beers are highly sensitive to light. As a result, the container or package must block the damaging portions of the light spectrum. The light-induced changes that occur to produce the characteristic light-struck or "skunky" flavor are well documented, for example by J. Templar, K. Arrigan, and W. J. Simpson, *Brewer's Digest*, Vol. 70, no. 5, pp 18–25 (1995) and references therein. It is generally accepted that not only ultraviolet light but also visible light of wavelengths shorter than about 550 nm is responsible for the formation of the light-struck flavor (Vita Biundo, Master Brewers Association of the Americas *Technical Quarterly*, Vol. 37, no. 2, pp. 233–238, and J. Templar, K. Arrigan, and W. J. Simpson, *Brewer's Digest*, Vol. 70, No. 5, pp 18–25 (1995).). It is therefore desirable that polymers intended for use in the packaging of beer block a large portion of ultraviolet and visible light with wavelengths of less than about 550 nm from reaching the beer. This light protection may be accomplished by the addition of UV light absorbers and/or colorants. However, for packaging food and beverages it is essential that the colorants and/or other additives not extract, migrate or exude from the polyester composition into the contents of packaging articles manufactured from the polyester composition.

Polyesters having colorants and other light-absorbing compounds admixed and copolymerized therein are known. U.S. Pat. No. 4,617,373 discloses the use of certain copolymerizable methine dyes at concentrations from about 1 to 5,000 ppm in condensation polymers including an amber poly(ethylene terephthalate) formulation. However, the light protection provided by the disclosed formulation is not effective for light protection requirements over the 320–400 nm and 400–550 nm wavelength ranges (Comparative Example 1). U.S. Pat. Nos. 4,617,374, 4,707,537, 4,749,773, and 4,749,779 disclose polyester compositions comprising poly(ethylene terephthalate) having copolymerized therein certain benzylidine methine type UV-absorbing compounds, but do not mention the use of these methine UV absorbing compounds to produce a light-protected, amber-colored polyester.

U.S. Pat. No. 4,521,556 discloses amber polyester compositions comprising poly(ethylene terephthalate) containing certain yellow and red anthraquinone colorants copolymerized in the polyester. However, the compositions disclosed provide insufficient light protection for beer, particularly in the wavelengths from about 360 nm to 430 nm and at wavelengths from about 460 nm to 550 nm (Comparative Example 2). U.S. Pat. No. 4,745,173 discloses polyester compositions comprising poly(ethylene terephthalate) containing 1 to 20,000 ppm of colorants having the 2,5-diarylaminoterephthalate chromophore. The '173 patent mentions the use of such orange colorants in the production of amber colored polyester, but does not mention any specific formulations that meet the light protection required for the packaging of beer. Experimentation has shown that the diarylaminoterephtalate chromophore inherently has a low extinction coefficient (absorptivity) and that high loadings or concentrations of colorants are required to block the blue spectral light at wavelengths of about 450 to about 490 nm when those colorants are combined with other colorants, such as yellow and red colorants, to produce the required amber color. These copolymerizable colorants containing the 2,5-diarylaminoterephtalate residue also lack the thermal stability needed for copolymerization into polyester at the upper range of temperatures usually encountered in the preparation of polyesters, e.g. temperatures above about 285° C.

U.S. Pat. No. 4,359,570 discloses the use of copolymerizable yellow and red anthraquinone colorants as colorants in polyesters for food and beverage packaging. Again, the possible use of such colorants in an amber formulation is mentioned, but no specific combination of colorants for the production of an amber polyester suitable for packaging beer is given.

BRIEF SUMMARY OF THE INVENTION

We have developed an amber polyester composition that absorbs a significant amount of light of wavelengths shorter than about 550 nm and is particularly suitable for use in the production of containers or other packaging materials intended for the packaging of materials that are susceptible to degradation by light of wavelengths shorter than about 550 nm. The amber polyester compositions are especially suitable for use in the manufacture of bottles for the packaging of beer. Accordingly, the present invention provides an amber polyester composition comprising a thermoplastic, molding grade polyester containing at least one compound, or the reacted residue of at least one compound, of each of Components I, II, and III and optionally IV wherein Components I, II and III have the formulas:

Component I Compounds:

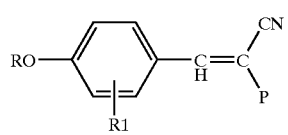

I-A

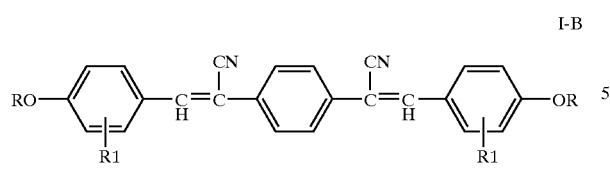
I-B
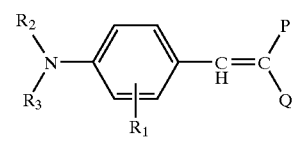
I-E
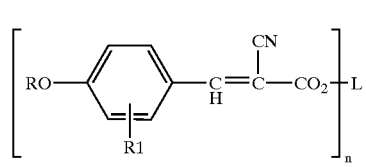
I-C
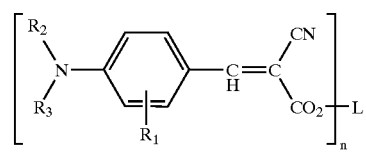
I-F
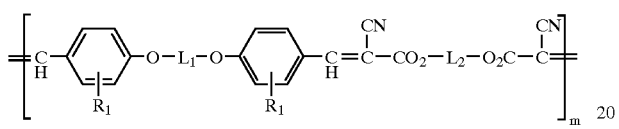
I-D
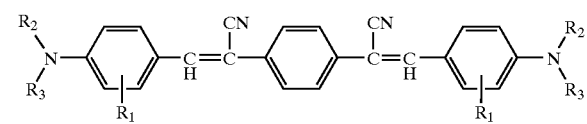
I-G
Component II Compounds:
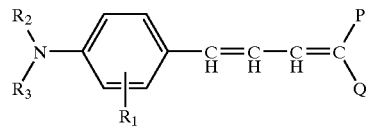
II-A
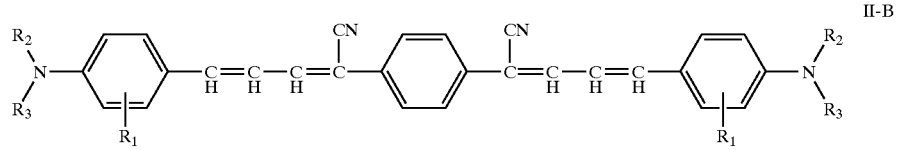
II-B
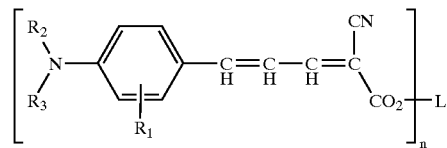
II-C
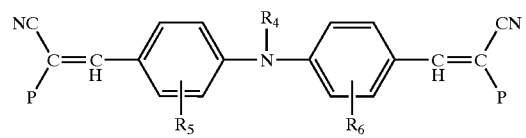
II-D
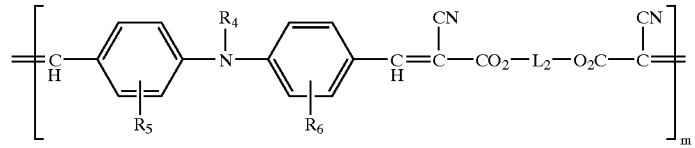
II-E
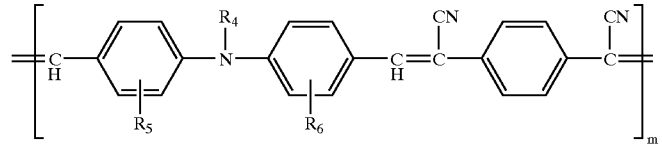
II-F -continued

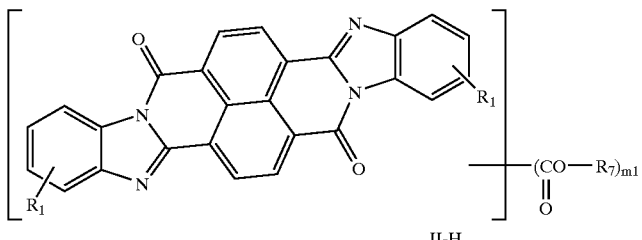
II-G

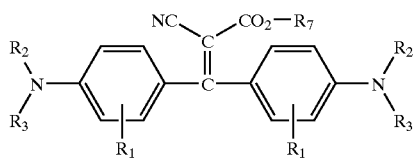
II-H

Component III Compounds:

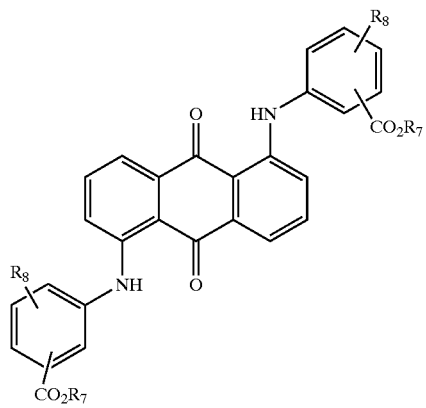
III-A

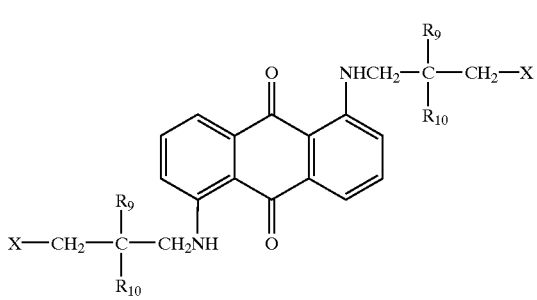
III-B and the Component IV Compound(s) are one or more phthalocyanine compounds; wherein R is hydrogen, $C_1$–$C_8$-alkyl, or —$(CH_2CH_2O)_{n1}$—$CH_2CH_2$—X wherein n1 is 1–3 and X is a polyester reactive group selected from hydroxy, carboxy, $C_2$–$C_6$-alkanoyloxy and $C_2$–$C_6$-alkoxycarbonyl;

$R_1$ is hydrogen or 1–2 groups selected from $C_1$–$C_6$-alkyl, $C_1$–$C_6$-alkoxy or halogen;

$R_2$ and $R_3$ each is $C_1$–$C_8$-alkyl, $C_3$–$C_8$-alkenyl, $C_3$–$C_8$-alkynyl, $C_3$–$C_8$-cycloalkyl or aryl; $R_2$ and $R_3$ in combination may represent a divalent group such as pentamethylene, ethyleneoxyethylene or ethylenesulfonylethylene; or $R_2$ in combination with $R_1$ may form an N-substituted 1,2,3,4-tetrahydroquinolin-6-yl ring, i.e., the residue having the structure:

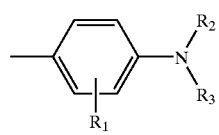

includes 1,2,3,4-tetrahydroquinoline radicals having the structure:

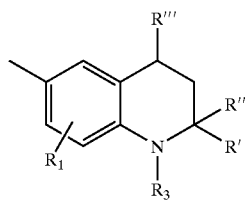

wherein R', R" and R'" are independently selected from hydrogen and $C_1$–$C_6$ alkyl;

$R_4$ is $C_1$–$C_8$-alkyl;

$R_5$ and $R_6$ each is hydrogen or one to two groups selected from $C_1$–$C_6$-alkyl, $C_1$–$C_6$-alkoxy and halogen;

$R_7$ is hydrogen, —$(CH_2CH_2O)_{n1}$—$CH_2CH_2$—X wherein n1 and X are defined above or $C_1$–$C_6$-alkyl;

$R_8$ is hydrogen or one or two groups selected from $C_1$–$C_6$-alkyl, $C_1$–$C_6$-alkoxy and halogen;

$R_9$ and $R_{10}$ each is hydrogen, $C_1$–$C_6$-alkyl, $C_3$–$C_8$-cycloalkyl or aryl;

P is cyano, $C_1$–$C_6$-alkylsulfonyl, arylsulfonyl, aryl, heteroaryl, —$CO_2R_{11}$ and —$CON(R_{12})R_{13}$, wherein $R_{11}$ is $C_1$–$C_6$-alkyl, $C_3$–$C_8$-alkenyl, $C_3$–$C_8$-cycloalkyl and aryl; $R_{12}$ and $R_{13}$ each is independently selected from hydrogen, $C_1$–$C_6$-alkyl, $C_3$–$C_8$-cycloalkyl, $C_3$–$C_8$-alkenyl and aryl;

Q is one of the groups in the preceding definition of P;

L is an organic di-, tri- or tetravalent linking group;

$L_1$ is an organic divalent linking group;

$L_2$ is an organic divalent linking group;

n is an integer from 1 to 4;

m is an integer from 2 to about 50; and $m_1$ is 0, 1 or 2.

The phthalocyanine compound may be unmetallized phthalocyanine or metalized phthalocyanine, e.g., wherein the metal of the metal phthalocyanine is copper, iron, zinc, sodium, nickel, manganese, magnesium, lithium, cobalt and the like.

The compounds of Components I, II, and III are thermally stable and may be added during the polymerization process used in the preparation of the molding grade polyester to produce a polyester having the compounds polymerized therein or reacted therewith due to the presence of a polyester-reactive group on the compounds. Alternatively, the compounds of Components I, II and III may be admixed with the thermoplastic polyester by melt blending and extrusion methods when the compounds have molecular weights of at least about 450, which avoids the unwanted problems of the compounds being subject to extraction, exudation or subliming from the amber colored polyester compositions. Similarly, the phthalocyanine component may be added during polymerization or by melt polymerization after preparation of the polyester.

BRIEF DESCRIPTION OF DRAWINGS

FIG. I is a transmission spectrum of amber polyester of Comparative Example 1.

FIG. II is a transmission spectrum of amber polyester of Comparative Example 2.

FIG. III is a transmission spectrum of the amber polyester of Example 7.

FIG. IV is a transmission spectrum of the amber polyester of Example 8.

FIG. V is a transmission spectrum of the amber polyester of Example 9.

FIG. VI is a transmission spectrum of the amber polyester of Example 10.

FIG. VII is a transmission spectrum of the amber polyester of Example 11.

DETAILED DESCRIPTION

In the above definitions of R, $R_1$, $R_2$, $R_3$, $R_4$, $R_5$, $R_6$, $R_7$, $R_8$, $R_9$, $R_{10}$, $R_{11}$, $R_{12}$, $R_{13}$, R', R", R'", Q, L, $L_1$ and $L_2$, the alkyl moieties referred to in the terms "$C_1$–$C_6$-alkyl", "$C_1$–$C_6$-alkoxy", $C_2$–$C_6$-alkoxycarbonyl: "$C_2$–$C_6$-alkanoyloxy, "$C_1$–$C_6$-alkyl-sulfonyl", etc., are saturated, straight or branched chain, hydrocarbyl radicals containing up to about six carbon atoms which may optionally be further substituted with one or two groups selected from hydroxy; halogen; cyano; aryl; $C_3$–$C_8$-cycloalkyl; —$OR_{14}$; —$SR_{14}$; —$SO_2R_{14}$; —$CO_2H$; —$CO_2R_{14}$; —$OCO_2R_{14}$; —$O_2C$—$R_{14}$, —$NHCOR_{14}$; —$NHSO_2R_{14}$; —$CONH_2$ and $CONHR_{14}$, wherein $R_{14}$ represents a straight or branched chain hydrocarbon radical which contains one to four carbons, $C_3$–$C_7$-cycloalkyl or aryl. The term "$C_1$–$C_8$-alkyl" as used herein indicates a straight or branched chain hydrocarbyl radical containing one to about eight carbon atoms optionally substituted with one or two groups selected from the groups mentioned above for the $C_1$–$C_6$-alkyl radicals. The terms "$C_3$–$C_8$-alkenyl" and "$C_3$–$C_8$-alkynyl" are used to indicate aliphatic hydrocarbon moieties containing 3–8 carbon atoms and at least one carbon—carbon double and carbon—carbon triple bond, respectively. The term "$C_3$–$C_8$-cycloalkyl" means a cyclic saturated hydrocarbon radical containing three to eight carbon atoms.

The term "halogen" includes bromine, chlorine, fluorine and iodine. The term "aryl" as used herein is used to include phenyl and phenyl substituted with one to three groups selected from halogen, $C_1$–$C_6$-alkyl, $C_1$–$C_6$-alkoxy, cyano, $CO_2H$, $C_2$–$C_6$-alkoxycarbonyl, $C_2$–$C_6$-alkanoyloxy, $C_1$–$C_6$-alkylthio, arylthio, arylsulfonyl, heteroarylthio, $C_1$–$C_6$-alkylsulfonyl, trifluoromethyl, $C_3$–$C_7$-cycloalkyl, hydroxy and $C_2$–$C_6$-alkanocylamino. The term heteroaryl is used herein to include benzothiazol-2-yl, benzoxazol-2-yl, benzimidazol-2-y1, 1,3,4-thiadiazol-2-yl, triazolyl, thiazol-2-yl, thienyl, furyl, pyrrolyl, pyrimidinyl, pyridyl and the like and these substituted with one to two groups listed on the phenyl group. The term "$C_2$–$C_{12}$-alkylene" is used herein to indicate a straight or branched divalent hydrocarbyl radical containing two to about twelve carbons, optionally substituted with one or two groups selected from $C_1$–$C_6$-alkoxy, aryloxy, arylthio, hydroxy, halogen, cyano, $C_2$–$C_6$-alkanoyloxy, carboxy, aryl and $C_2$–$C_6$-alkoxycarbonyl. The term "arylene" is used to denote 1,2-, 1,3- and 1,4-phenylene, optionally substituted with one or two groups selected from $C_1$–$C_6$-alkyl, $C_1$–$C_6$-alkoxy and halogen.

Examples of the organic, divalent groups represented by L, $L_1$ and $L_2$ include $C_2$–$C_{12}$-alkylene, $C_3$–$C_8$-cycloalkylene, arylene, —$CH_2$-1,4-cycloalkylene$CH_2$—, —$CH_2CH_2O)_{n1}$—$CH_2CH_2$—, —$CH_2CH_2O$-1,4phenylene-$OCH_2CH_2$— and $C_1$–$C_2$-alkylene-1,4-phenylene-$C_1$–$C_2$-alkylene. The tri- and tetra-valent organic radicals may be selected from any aliphatic hydrocarbon moieties containing three to about eight carbon atoms and which have three or four covalent bonds attached. Typical tri- and tetravalent linking groups which L may represent are —CH(—$CH_2$—)$_2$ and C(—$CH_2$—)$_4$, respectively.

Normally, the structures of the compounds of Components I, II and III should have or contain at least one polyester reactive group and/or have molecular weights of about 450 or above. Examples of the polyester reactive groups include hydroxy, carboxy, $C_2$–$C_6$-alkanoyloxy or $C_2$–$C_6$-alkoxycarbonyl which enable copolymerization of the compounds into the polyester during preparation or reaction with the terminal hydroxy or carboxy groups (or carboxylic esters) on a polyester material, such as poly (ethylene terephthalate). The compounds of Components I, II and III are added at such levels that that a film of the polyester composition having a thickness of from about 25 to 1016 microns (about 1 to 40 mil) transmits no more than an average of about 3% of ultraviolet and visible light over the wavelength ranges from about 300 to 450 nm, no more visible light than an average of about 7% over the 450 to 500 nm wavelength range, and no more visible light than an average of about 15% over the range from about 500 to 550 nm. The phthalocyanine compound of Component IV is added for shading purposes, e.g., in concentrations of about 50 to 300 ppm, not for blocking visible light.

The preferred compounds of formulas I-A and I-B are those in which R is hydrogen, methyl, 2-hydroxyethyl, 2-acetoxyethyl or 4-(methoxycarbonyl)benzyl; $R_1$ is hydrogen or methoxy; and P is cyano, methoxycarbonyl, methylsulfonyl or arylsulfonyl wherein aryl is phenyl or tolyl. The preferred formula I-C compounds consist of, those wherein R is hydrogen , methyl, 2-hydroxyethyl, 2-acetoxyethyl or 4-(methoxycarbonyl)benzyl; $R_1$ is hydrogen or methoxy; and L is ethylene, tetramethylene or 1,4-cyclohexylenedimethylene and n is 2 or L is C—($CH_2$)— and n is 4. The preferred formula I-D compounds consist of those wherein $R_1$ is hydrogen or methoxy; $L_1$ and $L_2$ are each ethylene, tetramethylene or 1,4-cyclohexylenedimethylene; and m is about 3 to 25. The preferred formula I-E compounds consist of those wherein $R_1$ is hydrogen, methyl or methoxy; $R_2$ and $R_3$ are independently selected from methyl, ethyl, 2-hydroxyethyl, 2-acetoxyethyl, 2-chloroethyl, 2-cyanoethyl, cyclohexyl, phenyl, benzyl, or 4-(methoxycarbonyl)benzyl; and P and Q are independently selected from cyano, methoxycarbonyl, ethoxycarbonyl, methylsulfonyl and arylsulfonyl wherein aryl is phenyl or tolyl.

The compounds of formula I-F and II-C that are preferred are those wherein $R_1$ is hydrogen, methyl or methoxy; $R_2$ and $R_3$ are independently selected from methyl, ethyl, 2-hydroxyethyl, 2-acetoxyethyl, 2-chloroethyl, 2-cyanoethyl, cyclohexyl, phenyl, benzyl, or 4-(methoxycarbonyl)benzyl; and L is ethylene, tetramethylene or 1,4-cyclohexylenedimethylene and n is 2 or L is C—(CH$_2$)— and n is 4. In the preferred compounds of formula I-G and II-B, $R_1$ is hydrogen, methyl or methoxy; and $R_2$ and $R_3$ are independently selected from methyl, ethyl, 2-hydroxyethyl, 2-acetoxyethyl, 2-chloroethyl, 2-cyanoethyl, cyclohexyl, phenyl, benzyl, or 4-(methoxycarbonyl)benzyl.

The preferred formula II-A compounds are compounds wherein $R_1$ is hydrogen, methyl or methoxy; $R_2$ and $R_3$ are independently selected from methyl, ethyl, 2-hydroxyethyl, 2-acetoxyethyl, 2-chloroethyl, 2-cyanoethyl, cyclohexyl, phenyl, benzyl, and 4-(methoxycarbonyl)benzyl; and P and Q are independently selected from cyano, methoxycarbonyl, ethoxycarbonyl, methylsulfonyl and arlysulfonyl wherein aryl is phenyl or tolyl. In the preferred compounds of formula II-D, $R_4$ is $C_1$–$C_4$ alkyl, 2-hydroxyethyl or 2-acetoxyethyl; $R_5$ and $R_6$ are each hydrogen; and P is $C_2$–$C_7$-alkoxycarbonyl. The preferred formula II-E compounds comprise those wherein $R_4$ is $C_1$–$C_4$ alkyl, 2-hydroxyethyl or 2-acetoxyethyl; $R_5$ and $R_6$ are each hydrogen; $L_2$ is ethylene, tetramethylene or 1,4-cyclohexylenedimethylene; and m is about 3 to 25. In the preferred formula II-F compounds $R_4$ is $C_1$–$C_4$ alkyl, 2-hydroxyethyl or 2-acetoxyethyl; and $R_5$ and $R_6$ are each hydrogen. In the preferred formula II-G compounds each $R_1$ is hydrogen, $R_7$ is hydrogen, methyl of 2-hydroxyethyl and m1 is 1 or 2. In the preferred formula II-H compounds each $R_1$ is hydrogen, $R_7$ is methyl, ethyl or 2-hydroxyethyl; and $R_2$ and $R_3$ are independently selected from methyl, ethyl, 2-hydroxyethyl, 2-acetoxyethyl, 2-chloroethyl, 2-cyanoethyl, cyclohexyl, phenyl, benzyl, or 4-(methoxycarbonyl)benzyl.

The preferred formula III-A compounds are those wherein $R_8$ is hydrogen, methyl or chloro and $R_7$ is hydrogen, methyl or 2-hydroxyethyl. In the preferred formula III-B compounds, $R_9$ and $R_{10}$ are indenpendently selected from hydrogen and methyl and X is hydoxy, acetoxy, carboxyl, methoxycarbonyl or ethoxycarbonyl.

The compounds of Component I are UV absorbers/yellow colorants which block the ultraviolet and violet light having wavelengths from about 320 to 435 nm. Normally, one or two of the Component I compounds are selected to combine with the other colorants used in the compositions of the present invention. The compounds of Component II are yellow/orange colorants that absorb the blue and greenish-blue light having wavelengths from about 435 to 490 nm. The compounds of Component III are red colorants that absorb the bluish-green and green light having wavelengths from about 490 to 555 nm. Those skilled in the art will recognize that the wavelengths described above are general guidelines and that the light absorption in some of the UV-visible absorption spectra may extend slightly beyond the particular limits set forth above or fail to extend to the defined limit, depending upon the absorption maximum of the particular compound and the shape of the absorption band.

The number of Component I, II and III light absorbing compounds typically required in the polyester compositions to absorb the unwanted wavelengths of UV-visible light may vary considerably depending upon the individual light absorbing properties of the light absorbers. Typically, at least one yellow orange (Component, II) compound is required and at least one red (Component III) compound and one or two UV absorber yellow (Component I) compounds. It will be apparent to those skilled in the art that the preferred colorant compounds of Components I, II and III are those that have the higher extinction coefficients (absorptivity) and colorants which have broader absorption curves in the visible light absorption curves. Such preferred compunds permit the formulation of polyester compositions from fewer colorant or light-absorbing compounds and provide adequate, light absorption over the desired wavelength ranges. The preferred number of total UV absorbers/colorant compounds of Components I, II and III in the amber polyester compositions of the present invention formulations is two to five, with three or four usually being most preferred.

The UV absorbers/colorant compounds of Components I, II and III are used to provide needed protection from UV-visible light for packaging beer and other light sensitive products. Although these products are not usually damaged by wavelengths longer than about 550 nm, some of the longer wavelength red light must be absorbed to produce a true amber color rather than a reddish hue. This is conveniently accomplished by the use of blue to greenish-blue colorants. The preferred colorants are the phthalocyanines, particularly a metal phthalocyanine and most particularly copper phthalocyanine such as C.I. Pigment Blue 15, 15:1, 15:2 and 15:3 (Colour Index International, Society of Dyes and Colourists). Those skilled in the art will understand that although amber is aesthetically preferred over red for packaging beer, a plastic bottle blow-molded from a polyester composition that provides adequate light protection over the 320–550 nm wavelength range is within the scope of the invention. Therefore, the present invention includes polyester compositions comprising a thermoplastic, mold-grade polyester containing at least one compound, or reacted residue of at least one compound, of each of the Component I, II and III compounds defined herein.

The UV light absorbers I-A are prepared as described in U.S. Pat. Nos. 4,617,374, 4,707,537, and 4,845,187. Compounds I-B and I-G are prepared by reacting the corresponding aldehydes with 1,4-phenylenediacetonitrile under basic conditions and in solvents such as alcohols, N,N-dimethylformamide, glycol ethers, etc. UV, absorbers I-C are prepared as disclosed in U.S. Pat. No. 4,749,774 and in Examples 4 and 5 below. Polymeric UV absorbers I-D are prepared according to the procedures described in U.S. Pat. No. 5,532,332 and the preparation of compounds I-E is disclosed in U.S. Pat. Nos. 4,617,373 and 5,106,942. Yellow compounds I-F are prepared by reacting the corresponding aldehyde with the active methylene (NCCH$_2$CO$_2$)$_n$ L in the presence of base in alcohols, DMF, etc. as solvents.

Orange compounds of formula II-A are prepared according to the procedures described in U.S. Pat. No. 4,617,373 and Example 2 below. The yellow brown compounds of Formula II-B are prepared as described in U.S. Pat. No. 4,082,721. Preparation of orange compounds II-C is illustrated in Example I below. Reddish-yellow compounds II-D are prepared as described in U.S. Pat. No. 4,617,373. Polymeric colorant compounds II-E and II-F are prepared using the procedures disclosed in U.S. Pat. No. 5,532,332. Preparation of compounds II-G is illustrated below in Example 3. Orange compounds II-H are prepared as illustrated in Examples 12 and 13.

Red compounds of formula III-A are prepared as disclosed in U.S. Pat. No. 4,359,570 and those of structure III-B are prepared in accordance with the procedures described in U.S. Pat. Nos. 4,999,418 and 3,955,564. The polymeric or oligorheric compounds of formulas I-D, II-E and II-F are prepared according to known procedures using dialdehydes and bis-active methylene compounds. Thus, as will be apparent to those skilled in the art, the polymeric light-absorbing compounds contain terminal groups, e.g., terminal groups $T_1$ and $T_2$, selected from residues of the aldehyde compound, the bis-active methylene compound or a mixture of the two.

In one embodiment of the present invention, the individual Component I, II and III compounds or the copolymerized or reacted residues thereof may be present in the polyester compositions in concentrations ranging from about 50 to 20,000 ppm and a total concentration ranging form about 200 to 25,000 ppm. Preferred ranges are about 100 ppm to 5,000 ppm for the individual UV-absorber/colorant compounds and about 500 ppm to about 15,000 ppm for the total concentration of the Component I, II and III UV-absorber/colorant compounds. The polyesters also normally contain about 50–300 ppm of a phthalocyanine colorant mixed in the polyesters. The ppm specified herein are parts per million by weight based on the total weight of the amber, molding grade compositions of the present invention. The concentrations of the UV-absorber/colorant compounds including the phthalocyanine described in this paragraph are the concentrations normally present in the containers, e.g., beer bottles, or at least one or more layers of multi-layer containers or bottles.

Polyester concentrates constitute another embodiment of the present invention wherein the concentrate comprises a polyester and increased concentrations of the compounds of Components I, II, III and optionally IV. The concentrates of UV-absorber/colorant compounds of Components I, II and III may be blended with non-colored or clear polyester, such as poly(ethylene terephthalate) at levels to provide the light absorption needed to protect food and drinks, especially beer, by known melt blending and extruding methods. The concentration of the individual light-absorbing compounds of Components I, II, III and optionally IV present in the polyester concentrates may range from about 0.5 to 30 weight percent with a maximum total concentration of all light-absorbing compounds of about 50 weight percent.

A phthalocyanine compound, preferably copper phthalocyanine (C.I. Pigment Blue 15, 15:1, 15:2 or 15:3) typically is used in concentrations of about 50–300 ppm level, either during polyester manufacture, i.e., during polymerization, or admixed by known melt blending and extruding methods.

The amber-colored polyester compositions of this invention are useful for forming bottles or other containers for packaging food and beverages, particularly beer. The coloration of the polyester is such that a substantial portion of ultraviolet and visible light wavelengths shorter than about 550 nm are prevented from reaching the contents of the container. Through the process of copolymerizatin or reaction with the thermoplastic polyesters the UV absorber/colorant compounds of Components I, II and III are rendered highly resistant to extraction, migration or exudation causing the amber polyester compositions to be especially suitable for packaging food and beverages. Suitable non extraction, non-migration and non-exudation properties also may be achieved by melt blending and extruding one or all of the UV-absorber/colorant compounds of Components I, II and III, with or without polyester-reactive groups, into polyesters, provided that the UV absorbers/colorants have molecular weights of about 450 or above. The polyester compositions of our invention are not limited to use in containers that consist of only a single layer of the polyester, but also can be used in one or more layers of a multi-layer container. If desired the polyester compositions may be admixed with a variety of other materials. Such materials may be recycled polyester or substances that impart gas barrier or oxygen scavenging properties.

The polyester polymer useful in the present invention is not critical and may be any polyester useful for forming containers. Preferably, the polyester comprises:
 (1) diacid residues comprised of at least about 50 mole percent, preferably at least 85 mole percent, terephthalic acid residues or 2,6-naphthalenedicarboxylic acid residues; and
 (2) diol or glycol residues comprising at least abut 50 mole percent, preferably at least 85 mole percent, ethylene glycol residues.

The dicarboxylic acid components (or diacid residues) of the polyester optionally may be modified by one or more dicarboxylic acids other than terephthalic or 2,6-naphthalenedicarboxylic acids or their reactive equivalents such as dimethyl terephthalate or dimethyl 2,6-naphthalenedicarboxylate. Such additional dicarboxylic acid residues may be derived from aromatic dicarboxylic acids, preferably having 8 to 14 carbon atoms, aliphatic dicarboxylic acids, preferably having 4 to 12 carbon atoms, or cycloaliphatic dicarboxylic acids having 8 to 12 carbon atoms. Examples of such additional dicarboxylic acids that may be included with terephthalic acid and/or naphthalenedicarboxylic acid include, but are not limited to: phthalic acid, isophthalic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like. Polyesters may be prepared with two or more of the above dicarboxylic acids. The polyesters dicarboxylic acid residue or residues may be derived from the dicarboxylic acids, esters and acid halides thereof, and, in some cases, from their anhydrides.

Similarly, the diol component also may be modified with one or more different diols other than ethylene glycol. Such additional diols include, but are not limited to, cycloaliphatic diols preferably having 6 to 20 carbon atoms or aliphatic diols having 3 to 20 carbon atoms. Examples of such additional diol residues are the residues derived from diethylene glycol, triethylene glycol, 1,4-cyclohexanedimethanol, propane-1,3-diol, butane-1,2-diol, butane-1,4-diol, pentane-1,5diol, hexane-1,6-diol, 3-methyl-2,4-pentanediol, 2-methyl-1, 3-pentanediol, 2,2,4-trimethyl-1,3-pentanediol, 2-ethyl-1,3-hexanediol, 2,2-diethyl-1,3-propanediol, 1,3-hexanediol, 1,4-bis(2-hydroxyethoxy)benzene, 2,2-bis-(4-hydroxycyclohexyl)-propane, 2,4-dihydroxy-1,1,3,3-tetramethylcyclobutane, 2,2-bis-[3-(hydroxyethoxy)phenyl]-propane, and 2,2-bis-[(4-hydroxypropoxy)phenyl]propane. The polyesters may be prepared with two or more of the above diols.

The polyester polymers described above also may contain small amounts of trifunctional or tetrafunctional comonomers such as residues of trimeliitic anhydride, trimethylolpropane, pyromellitic dianhydride, pentaerythlritol, and other polyester-forming polyacids or polyols generally known in the art.

The polyester compositions and polymers of the present invention can be prepared by conventional polycondensation procedures well-known in the art. Such processes include direct condensation of the dicarboxylic acid(s) with the diol(s) or by ester interchange using one or more dialkyl dicarboxylates with the diol(s). For example, a dialkyl terephthalate such as dimethyl terephthalate is ester interchanged with the diol(s) at elevated temperaterues in the presence of a catalyst. The polyester may also be subjected to solid state polymerization methods. Polyethylene naphthalenedicarboxylate polyesters also may be prepared by known polycondensation procedures.

The polyesters may be prepared employing polyester-forming conditions well known in the art. For example, a mixture of one or more dicarboxylic acids, preferably aromatic dicarboxylic acids, or ester forming derivatives thereof, and one or more diols may be heated in the presence of esterification and/or polyesterifcation catalysts at temperatures in the range of about 150 to 300° C. and pressures of atmospheric to about 0.2 Torr (0.2 mm Hg). A preferred temperature range for a polyester condensation is about 260 to 300° C. Normally, the dicarboxylic acid or derivative thereof is esterified or transesterified with the diol(s) at atmospheric pressure and at a temperature at the lower end of the specified range. Polycondensation then is effected by increasing the temperature and lowering the pressure while excess diol is removed from the mixture.

Typical catalysts or catalyst systems for polyester condensation are well-known in the art. For example, catalysts disclosed in U.S. Pat. Nos. 4,025,492, 4,136,089, 4,176,224, 4,238,593, 5,650,481, 5,668,243, 5,688,899, and 5,744,571 may be used to prepare the preparation of the polyesters. Further, R. E. Wilfong, *Journal of Polymer Science*, 54, 385 (1961) sets forth typical catalysts which are useful in polyester condensation reactions.

The preferred polyesters referred to herein include linear, thermoplastic, crystalline or amorphous polyesters produced by conventional polymerization techniques from one or more diols and one or more dicarboxylic acids. The polyesters normally are molding or fiber grade and have an inherent viscosity (I.V.) of about 0.4 to 1.2 dL/g, preferably about 0.6 to 0.9 dL/g, measured at 25° C. using 0.50 g of polyester per 100 ml of solvent consisting of 60 weight percent phenol and 40 weight percent tetrachloroethane.

Various other ingredients may be present in the polyester compositions to enhance the performance properties of the polyesters. For example, cystallization aids, impact modifiers, surface lubricants, denesting agents, stabilizers, antioxidants, acetal deactivators, nucleating agents, mold releases, platelet particles, oxygen scavenging compositions, oxygen scavenging catalysts, and the like can be included. All of these additives and many others and their use are well known in the art and do not require extensive discussion. Therefore, only a limited number will be referred to, it being understood that any of these compounds can be used so long as they do not hinder the present invention from accomplishing its objectives.

To adequately protect beer from light-induced degradation, the container or bottle prepared from the ambercolored polyester compositions of the present invention should transmit no more than an average of about 3% of the light over the wavelength range from about 300 to 450 nm, no more than about 7% from about 450 to 500 nm and no more than average of about 15% from about 500 to 550 nm. The percentage of UV-visible light transmitted may be determined by using available UV-visible spectrometers such as a Perkin-Elmer Lambda 4B, Lambda 6 or Lambda 20 UV-visible spectrometers. More preferably, the amber-colored polyester compositions of the present invention transmit no more than an average of about 1% of the light over the wavelength range of from about 300 to 450 nm, no more than an average of about 3% from about 450 to 500 nm and no more than an average of about 10% from about 500 to 550 nm. This amount of light blockage is achieved for a layer or container wall thickness of the polymer that may range from about 25 to 1270 microns (about 1 to 50 mil), more preferably from about 51 to 635 microns (about 2 to 25 mil), and most preferably from about 75 to 432 microns (about 3 to 17 mil). The polyester composition can provide this light protection in a container made from a single layer or a bottle consisting of multiple layers of the polyester composition. In the case of a multi-layer bottle, the colored polyester composition may be used in one, some or all of the layers. Additionally, the polyester composition may be admixed with other materials without deviating from the present invention. Such materials may be other polymers, such as recycled plastic, polyamides, poly(vinylalcohol), polyolefins, and other thermoplastics.

The polyester compositions of the present invention utilize the intrinsic light blocking characteristics of the terephthalic acid residues of the polyester to block those wavelengths shorter than about 315 nm or, in the case of a polyester containing significant amounts of naphthalenedicarboxylic residues, those wavelengths shorter than about 370 nm.

The preferred thermoplastic, amber, molding compositions of the present invention comprise a polyester having an inherent viscosity of about 0.6 to 0.9 dL/g comprising:

(1) diacid residues comprised of at least about 85 mole percent terephthalic acid residues, 2,6-naphthalenedicarboxylic acid residues, or a mixture of terephthalic acid and 2,6-naphthalenedicarboxylic acid residues;

(2) diol residues comprising at least about 50 mole percent, preferably at least 85 mole percent, ethylene glycol residues;

wherein (i) the polyester has copolymerized therein or reacted therewith the residues of at least one compound of Components I, II, and III with the provision that the compounds of Components I, II, and III contain at least one polyester reactive group; or (ii) the polyester has admixed therein at least one compound of Components I, II, and III with the provision that the compounds of Components I, II, and III have molecular weights of at least about 450;

wherein the compounds of Components I, II, and III are defined above; provided that light absorbing compounds of Components I, II, and III or the reacted residues thereof are present at in the polyester composition in concentrations that will cause a film of the polyester composition having a thickness of about 25 to 1016 microns (about 1 to 40 mil) will transmit (i) no more than an average of about 3% of ultraviolet and visible light over the wavelength range from about 350 to 450 nm, (ii) no more visible light than an average of about 7% over the wavelength range from about 450 to 500 nm and (iii) no more visible light than an average of about 15% over the range of about 500 to 550 nm; and optionally, wherein about 50–300 ppm of a phthalocyanine blue colorant is admixed in the thermoplastic polyester.

It is more preferred that light absorbing compounds of Components I, II, and III or the reacted residues thereof are present in the amber polyester composition in concentrations that will cause a film of the polyester composition having a thickness of about 76 to 432 microns (about 3 to 17 mil) to transmit (i) no more than an average of about 1% of ultraviolet and visible light over the wavelength range from about 300 to 450 nm, (ii) no more visible light than an average of about 3% over the wavelength range from about 450 to 500 nm wavelength range and (iii) no more visible light than an average of about 10% over the range of about 500 to 550 nm. In another preferred embodiment of the invention, one or two Component I compounds or reacted residue(s) thereof, is/are present in concentrations of about 100 to 2,000 ppm; at least one Component II compound or reacted residue thereof is present at a concentration of about 100 to 5,000 ppm; and at least one Component III compound or reacted residue thereof is present in a concentration of about 150 to 2,500 ppm in the amber polyester compositions.

In another preferred embodiment of the invention, the amber polyester composition contains 100 to 5,000 ppm of at least one colorant of Formula II-F or the reacted residues thereof; 100 to 2,000 ppm of at least one of the Component I compounds or reacted residue thereof; 150 to 2,500 ppm of at least one of the Component III compound or reacted residue thereof; and 50 to 300 ppm of copper phthalocyanine.

In another highly preferred embodiment of the invention the amber polyester contains 500–6,000 ppm of at least one colorant or reacted residue thereof of Formula II-B; 50–300 ppm of copper phthalocyanine; optionally 100–2,000 ppm of at least one of the Component I compounds or reacted residue thereof; optionally 150–2,500 ppm of at least one of the Component III compounds, or reacted residue thereof.

Representative light-absorbing compounds which may be used in the preparation of the amber polyester compositions of the present invention have the structures set forth below.

Component I Compounds:

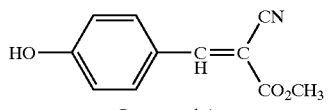

Compound A
(U. S. Patent 4,617,374-Example B)

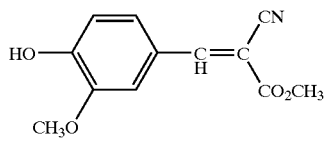

Compound B
(U. S. Patent 4,617,374-Example 6)

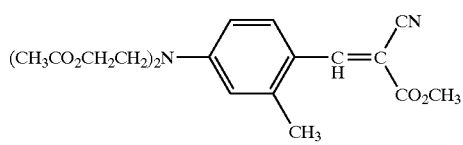

Compound C
(U. S. Patent 4,617,373-Example 17)

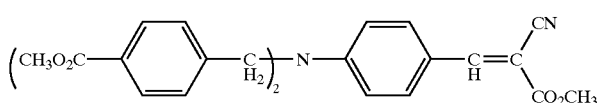

Compound D
(U. S. Patent 4,617,373)

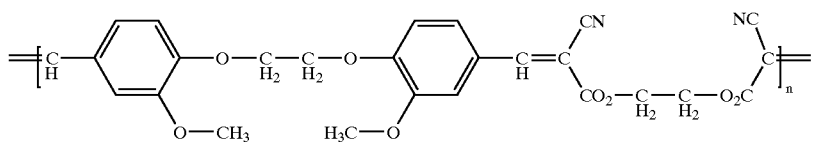

Compound E
(U. S. Patent 5,532,332)

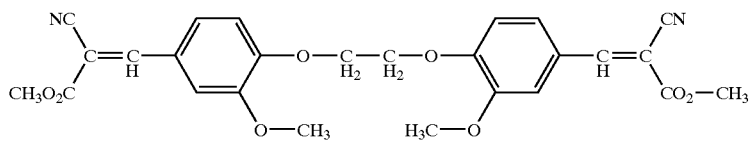

Compound F
(U. S. Patent 4,749,774-Example 2)

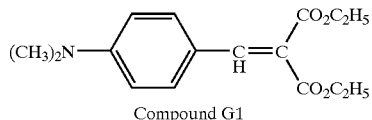

Compound G1
(U. S. Patent 4,617,373-Example 2)

-continued
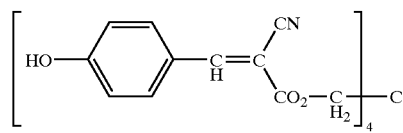
Compound G2
(Example 5)
Component II Compounds
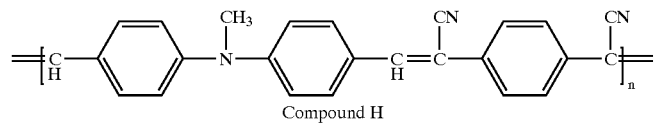
Compound H
(U. S. Patent 5,532,332-Example 1)
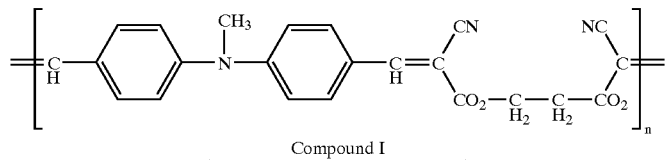
Compound I
(U. S. Patent 5,532,332-Example 5)
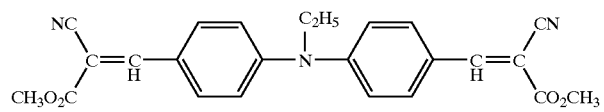
Compound J
(U. S. Patent 4,617,373-Example 495)
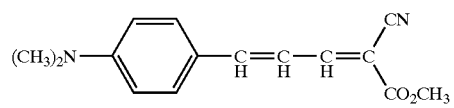
Compound K
(U. S. Patent 4,617,373-Example 1)
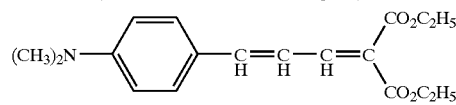
Compound L
(U. S. Patent 4,617,373)
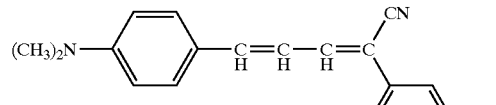
Compound M1
(U. S. Patent 4,082,721-Example 15)
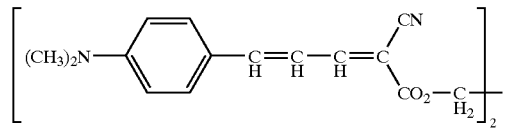
Compound M2
(Example 1)
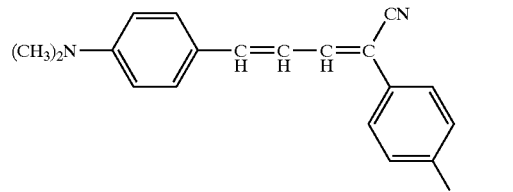
Compound N
(Example 2)

-continued
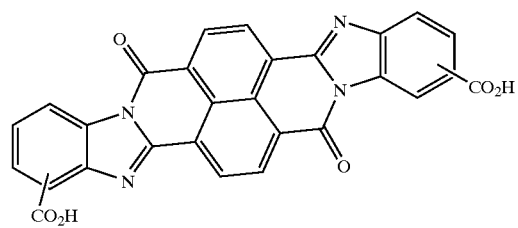
Compound O
(Example 3)
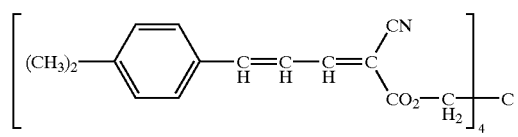
Compound P
(Example 6)
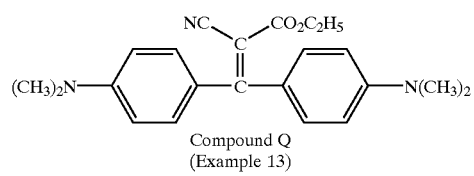
Compound Q
(Example 13)
Component III Compounds
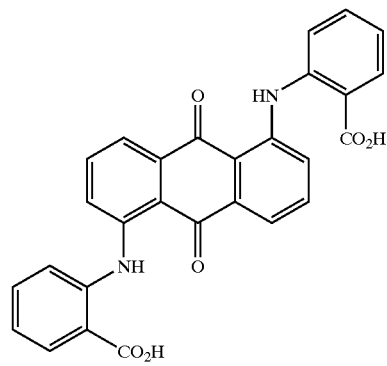
Compound R
(U. S. Patent 4,359,570-Example 2)
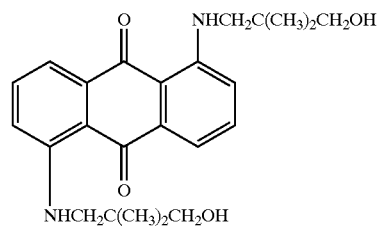
Compound S
(U. S. Patent 4,999,418-Example 1)
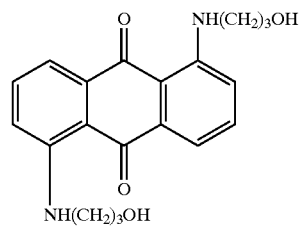
Compound T
(U. S. Patent 5,955,564)

Blue Colorant

Copper Phthalocyanine (C.I. Pigment Blue 15) Compound U

EXAMPLES

The novel amber polyester compositions of the present invention and the preparation thereof, including the preparation of some of the light-absorbing compounds useful therein, are further illustrated by the following examples.

Example 1 (Compound M2)

A mixture of 4-(N,N-dimethyamino)cinnamaldehyde (3.50 g, 0.02 mol), 1,2-ethanediyl bis(cyanoacetate) (1.96 g, 0.01 mol) (GB1,048,348), N,N-dimethylformamide (DMF, 15.0 ml) and piperidine acetate (0.33 g) was stirred and heated at 95–100° C. for about 2 hours. More N,N-dimethylformamide (10 ml) was added to facilitate stirring. After being heated for about 0.5 hour longer at 95–100° C., the reaction mixture was allowed to cool and drowned into methanol. The orange colored product was collected by filtration, washed with methanol and dried in air. Field desorption mass spectrometry (FDMS) supported the structure for compound M2. An absorption maximum was observed at 474 nm in DMF in the UV-visible light absorption spectrum (extinction coefficient—85,200).

Example 2 (Compound N)

A mixture of 4-(N,N-dimethylamino)cinnamaldehyde (1.75 g, 0.01 mol), 4-methoxycarbonylphenylacetonitrile (1.75 g, 0.01 mol), DMF (15 ml) and piperidine acetate was heated at about 100° C. for 3.0 hours. The reaction mixture was cooled and added to methanol. The orange colored solid was collected by filtration, washed with methanol and dried in air. An absorption maximum at 450 nm was observed in DMF in the UV-visible light absorption spectrum (extinction coefficient—55,263). FDMS supported the structure for Compound N.

Example 3 (Compound O)

A mixture of 1,4,5,8-naphthalene tetracarboxylic dianhydride (6.7 g, 0.025 mol), 3,4-diaminobenzoic acid (7.6 g, 0.05 mol) and acetic acid (200 ml) was heated at reflux for 6.0 hours. The reaction mixture was allowed to cool and the reddish-brown product was collected by filtration through a coarse fritted glass funnel, washed with water and then washed with methanol. The product has the structure set forth above and designated Compound O.

Example 4

Cyanoacetic acid (200 g. 2.35 mols), pentaerythritol (53.39 g, 0.39 mol), p-toluenesulfonic acid monohydrate (2.67 g) and 700 mL of a toluene were added to a 2-L, round-bottomed flask equipped with a mechanical stirrer, a Dean-Stark trap and a heating mantle. The reaction mixture was heated to reflux until water distillation stopped. The reaction vessel was allowed to cool to room temperature and the toluene layer was decanted. Ethyl acetate (1 L) was added to the reaction vessel and the mixture was stirred for 10 minutes. The solid residue was removed by filtration and dissolved into 700 mL of DMF. The ethyl acetate layer was transferred back to the reaction vessel and water (500 mL) was added. Sodium bicarbonate (50 g, 0.6 mol) was added in several small quantities. The mixture was transferred to a separatory funnel and the aqueous layer was discarded. The organic layer was washed with 500 mL of water, dried over anhydrous magnesium sulfate, filtered and concentrated to an oil that crystallized upon standing. The solid was added to the DMF solution and stirred until a homogeneous solution was obtained. The product was precipitated by slowly adding 100 mL of water with stirring. The solid was isolated by suction filtration and washed with 200 mL of water. The cake was drawn down on the filter paper overnight to give 64.66 g of the product as a white solid. The structure was confirmed by $^1$H NMR analysis, $\delta$=3.37 (s,8 h); 3.17 (s, 8 h) to be pentaerythritol tetracyanoacetate.

Example 5 (Compound G2)

To a clean, dry, 250-mL, round-bottomed flask equipped with a magnetic stir bar was added 10.0 g (24.8 mmol) of pentaerythritol tetracyanoacetate (from Example 4), 12.09 g (99.0 mmols) of p-hydroxybenzaldehyde and 75 mL of DMF followed by the addition of piperidine acetate (0.03 mmol). The reaction vessel was stirred at room temperature for 20 minutes then heated to 80° C. by lowering the reaction vessel into preheated oil bath. The reaction vessel was stirred at 80° C. for 5 hours, then allowed to cool to room temperature. Methanol (200 mL) was added to the reaction mixture with stirring followed by 300 mL of water. The product separated from solution as an oil that crystallized upon standing. The solid was crushed using a spatula and isolated by suction filtration. The cake was washed with 200 mL of water followed by 50 mL of methanol and allowed to be drawn down on the filter overnight to give 17.93 g of a pale yellow solid. The structure was shown to be that of Compound G2 by mass spectral anaylsis (m/z=820). An absorption maximum was observed at 345 nm in the UV-Vis absorption spectrum in DMF.

Example 6 (Compound P)

Reaction of 4-(N,N-dimethylamino)cinnamaldehyde with pentaerythritol-tetracyanoacetate: To a clean, dry 100 mL round-bottomed flask equipped with a magnetic stir bar was added 250 mg (0.62 mmol) of pentaerythritol-tetracyanoacetate, 438 mg (2.5 mmols) of 4-(N,N-dimethylamino)cinnamaldehyde and 25 mL of DMF followed by the addition of piperidine acetate (0.03 mmol). The reaction vessel was heated to 80° C. by lowering the reaction vessel into preheated oil bath. The reaction vessel was stirred at 80° C. for 2 hours then allowed to cool to room temperature. The reaction mixture was poured into 50 mL of de-ionized water with stirring and the solid product was isolated by suction filtration. The cake was washed with 100 mL of water followed by 20 mL of methanol and drawn down on the filter overnight to give a red-orange solid. The identity of the reaction product was confirmed by mass spectral analysis (m/z=1033) to be that of Compound P. UV-Vis spectral analysis: $\lambda_{max}$=474.6 nm, $\epsilon$=142,000 (DMF)

Example 7

The following materials were placed in a 500 mL, three-necked, round-bottom flask:
- 97.0 g (0.50 mol) dimethyl terephthalate
- 61.5 g (0.99 mol) ethylene glycol
- 1.12 g (0.0078 mol) 1,4-cyclohexanedimethanol
- 0.23 mL of a solution of titanium tetraisopropoxide in n-butanol
  [0.0256 g Ti[OCH(CH$_3$)$_2$]$_4$/ml of sol.]
- 3.05 ml of a solution of antimony triacetate in ethylene glycol

[0.797 g Sb(OAc)₃/mL of solution]
0.0289 g (300 ppm) Compound G1
0.0492 g (500 ppm) Compound H
0.0677 g (700 ppm) Compound T and
0.0128 g (125 ppm) Compound U.

The flask was equipped with a nitrogen inlet, stirrer, vacuum outlet and condensing flask. The flask and contents were heated in a Belmont metal bath for about 1.0 hour at 200° C. The temperature was increased to about 210° C. over about 10 minutes and then held at 210° C. for about 65 minutes. The temperature was increased to about 268° C. over 30 minutes and then 0.35 mL of an ethylene glycol solution of a mixed phosphorus ester composition (Merpol A) (0.0914 g Merpol A/mL of solution). The pressure was reduced from atmospheric to about 120 torr over 5 minutes and held for about 50 minutes. Polycondensation was completed by increasing the temperature to about 285° C. over about 5 minutes, reducing the pressure to about 8 torr over 5 minutes, holding at this temperature and pressure for 25 minutes, reducing the pressure to about 8 torr over 5 minutes, holding at this pressure for about 25 minutes, reducing the pressure to about 0.5 torr over 1 minute and holding for 20 minutes. The flask was removed from the metal bath and was allowed to cool in a nitrogen atmosphere. The resulting amber polyester had an inherent viscosity of about 0.66 as measured in a 60/40 ratio by weight of phenol/tetrachloroethane at a concentration of about 0.5 g per 100 mL.

After grinding in a Wiley mill and passing the solid through a 3 mm screen, a 380 micron (15 mil) film was prepared by compression molding of a portion of the amber polyester composition. The transmission spectrum of the film is provided in FIG. III, which shows that excellent blockage of UV and visible light was achieved over the desired range of wavelengths from 300–550 nm using a Perkin Elmer Lambda 6 UV-Vis spectrometer.

Example 8

An amber polyester was prepared exactly as described in Example 7, except that the light-absorbing compounds used in Example 7 were replaced with Compound G1 (300 ppm), Compound M1 (700 ppm) Compound R (300 ppm) and Compound U (125 ppm). The transmission spectrum of a 380 micron (14 mil) molded film is shown in FIG. IV which indicates excellent blockage of UV and visible light over the desired wavelength range of about 300–350 nm.

Example 9

An amber polyester was prepared exactly as described in Example 7, except that the light-absorbing compounds used in Example 7 were replaced with Compound C (400 ppm), Compound D (100 ppm), Compound O (700 ppm), Compound R (800 ppm) and Compound U (125 ppm). The polymer as prepared had an inherent viscosity of about 0.63 dL/g as measured in a 60/40 phenol/tetrachloroethane solution at a concentration of about 0.5 g per 100 mL. The transmission spectrum of a 380 micron (15 mil) film is shown in FIG. V, which shows adequate UV-visible light blockage over the desired wavelength range.

Example 10

An amber polyester was prepared exactly as in Example 7, except that 200 ppm Compound A, 800 ppm Compound L, 800 ppm Compound T and 125 ppm Compound U were used to block the UV-visible light. The transmission spectrum of a 380 micron (14 mil) film is shown in FIG. VI, which indicates excellent blockage of UV-visible light over the 300–550 nm range.

Example 11

An amber polyester was prepared exactly as described in Example 7, except that 300 ppm Compound G1, 700 ppm Compound K, 750 ppm Compound R and 125 ppm Compound U were used to block the UV-Visible light. The transmission spectrum is shown in FIG. VII, which indicates that light blockage over the 300–555 nm is excellent.

Example 12

To benzene (700 mL) was added 4,4'-bis(dimethylamino) benzophenone (50.0 g). The mixture was stirred and treated with thionyl chloride (30 mL) at about 70° C. The reaction mixture turned blue and a solid resulted, which was collected by filtration, washed with water and then the benzene-wet solid was added portion-wise to a solution of ethanol (50 mL) with which sodium metal (20 g) had been reacted. The reaction mixture was stirred for 1.5 hours and placed in an evaporating dish. Some water was added and the benzene and some of the ethanol were allowed to evaporate. The resulting solid was collected by filtration. The water-wet material was dissolved in about 100 mL of hot ethanol and water added until precipitation of product began. The mixture was then cooled and the product bis-(4-dimethylaminophenyl)-diethoxymethane, was collected by filtration, washed with water and dried in air (m.p.=113° C.).

Example 13 (Compound Q)

A portion of the ketal product from Example 12 (6.8 g) and ethyl cyanoacetate (16 mL) were mixed and heated gradually at about 145° C. while ethanol was evolved. The temperature was increased gradually to 170–175° C. and held for 1.0 hr. allowing any remaining distillate to be removed. The reaction mixture was cooled and the solid collected by filtration, washed with diethyl ether and dried. After being crystallized from tetrahydrofuran the product was obtained as a bright orange solid (4.4 g, m.p.=177–179° C.). The product had the structure of Compound Q.

Examples 14–46 were prepared exactly as described in Example 7 with the amounts of light absorbing compounds present as described in Table I. All of the films prepared had excellent UV-Visible light blockage as indicated by the UV-visible light mission curves which were prepared using a Perkin Elmer Lambda 6 UV-Vis spectrophotometer.

TABLE I

Amber Polyester Formulations

| Example No. | Component I Compound | Component II Compound | Component III Compound | Component IV Compound |
|---|---|---|---|---|
| 14 | 200 ppm Compound B | 600 ppm Compound H | 750 ppm Compound T | 125 ppm Compound U |
| 15 | — | 800 ppm Compound H | 1000 ppm Compound R | 125 ppm Compound U |
| 16 | 200 ppm Compound F | 700 ppm Compound H | 700 ppm Compound T | 125 ppm Compound U |
| 17 | 400 ppm Compound D | 400 ppm Compound H | 800 ppm Compound T | 125 ppm Compound U |

TABLE I-continued

Amber Polyester Formulations

| Example No. | Component I Compound | Component II Compound | Component III Compound | Component IV Compound |
|---|---|---|---|---|
| 18 | 400 ppm Compound E | 600 ppm Compound H | 800 ppm Compound T | 125 ppm Compound U |
| 19 | 500 ppm Compound C | 400 ppm Compound M2 | 850 ppm Compound R | 125 ppm Compound U |
| 20 | 500 ppm Compound G1 | 500 ppm Compound M2 | 850 ppm Compound R | 125 ppm Compound U |
| 21 | 200 ppm Compound B 500 ppm Compound D | 500 ppm Compound M2 | 500 ppm Compound T | 125 ppm Compound U |
| 22 | 200 ppm Compound G1 400 ppm Compound C | 300 ppm Compound M2 | 800 ppm Compound R | 125 ppm Compound U |
| 23 | 300 ppm Compound G1 450 ppm Compound D | 450 ppm Compound M2 | 500 ppm Compound S | 125 ppm Compound U |
| 24 | 500 ppm Compound G1 | 600 ppm Compound P | 850 ppm Compound R | 125 ppm Compound U |
| 25 | 200 ppm Compound B | 1000 ppm Compound J | 800 ppm Compound R | 125 ppm Compound U |
| 26 | 200 ppm Compound B | 600 ppm Compound J 200 ppm Compound H | 60 ppm Compound R | 125 ppm Compound U |
| 27 | 200 ppm Compound G1 | 1000 ppm Compound I | 900 ppm Compound T | 125 ppm Compound U |
| 28 | 300 ppm Compound B | 1000 ppm Compound M1 | — | 125 ppm Compound U |
| 29 | — | 2000 ppm Compound M1 | — | 125 ppm Compound U |
| 30 | 300 ppm Compound G1 500 ppm Compound D | 450 ppm Compound M1 | 500 ppm Compound T | 125 ppm Compound U |
| 31 | 200 ppm Compound G1 | 700 ppm Compound M1 300 ppm Compound H | — | 125 ppm Compound U |
| 32 | 300 ppm Compound G1 | 600 ppm Compound M1 | 500 ppm Compound R | 125 ppm Compound U |
| 33 | — | 800 ppm Compound H 700 ppm Compound M1 | — | 125 ppm Compound U |
| 34 | 300 ppm Compound G1 | 700 ppm Compound M1 | — | 125 ppm Compound U |
| 35 | 400 ppm Compound G1 | 700 ppm Compound N | 700 ppm Compound T | 125 ppm Compound U |
| 36 | 500 ppm Compound C | 460 ppm Compound N | 950 ppm Compound R | 125 ppm Compound U |
| 37 | 500 ppm Compound B 250 ppm Compound C | 300 ppm Compound N | 700 ppm Compound S | 125 ppm Compound U |
| 38 | 100 ppm Compound B 400 ppm Compound C | 700 ppm Compound O | 800 ppm Compound R | 125 ppm Compound U |
| 39 | 200 ppm Compound B | 800 ppm Compound L | 800 ppm Compound T | 125 ppm Compound U |
| 40 | 200 ppm Compound G2 | 800 ppm Compound L | 800 ppm Compound S | 125 ppm Compound U |
| 41 | 300 ppm Compound G | 650 ppm Compound K | 650 ppm Compound T | 125 ppm Compound U |
| 42 | 300 ppm Compound F | 800 ppm Compound L | 800 ppm Compound T | 125 ppm Compound U |
| 43 | 200 ppm Compound $G_1$ | 800 ppm Compound L | 800 ppm Compound R | 125 ppm Compound U |
| 44 | 300 ppm Compound E | 800 pm Compound L | 800 ppm Compound R | 125 ppm Compound U |
| 45 | 200 ppm Compound B | 800 ppm Compound Q | 900 ppm Compound T | 125 ppm Compound U |
| 46 | 200 ppm Compound G1 | 800 ppm Compound Q | 900 ppm Compound R | 125 ppm Compound U |

Comparative Example 1

The amber polyester formulation disclosed in Example 761 of U.S. Pat. No. 4,617,373 was prepared by using the following procedure:

The following material were placed in a 500 mL, three-necked, round-bottom flask:

97.0 g (0.5 mol) dimethyl terephthalate 62.0 g (1.0 mol) ethylene glycol 0.0467 g (484 ppm) of yellow colorant used in Example 761 of U.S. Pat. No. 4,617,323

0.0216 g (225 ppm) of red colorant used in Example 761 of U.S. Pat. No. 4,617,323

0.0046 g (47 ppm) copper phthalocyanine (C.I. Pigment Blue 15)

2.9 mL of a solution of titanium tetraisopropoxide in n-butanol

[0.0030 g Ti[OCH $(CH_3)_2$]$_4$]/mL of solution]

The flask was equipped with a nitrogen inlet, stirrer, vacuum outlet and condesing flask. The mixture was heated and stirred at about 200° C. at atmospheric pressure for about 1.0 hour using a Belmont metal bath. The reaction temperature was then increased to about 210° C. Over about 5 minutes and held at 210° C. for about 90 minutes. Over about 20 minutes, the temperature was increased to about 280° C. Nitrogen flow was stopped and vacuum was applied to decrease the pressure to about 100 torr over about 5 minutes. The polycondensation was completed by reducing the pressure to about 0.5 torr over about 5 minutes and heating at about 280° C. for 1.0 hour. After cooling, the amber colored polyester was ground using a Wiley mill to pass through a 3 mm screen. A 380 micron (15 mil) film was prepared from a portion of the ground polyester material by compression molding. The UV-visible light transmission spectrum is provided of the film in FIG. 1, which shows that the formulation provides poor absorption of light, particularly over the wavelength ranges of about 325–400 nm and 455–550 nm and would not be suitable for packaging materials where the blockage of UV and visible light is critical.

Comparative Example 2

Example 7 was repeated exactly except that the colorants and amounts of colorants used were those disclosed in U.S. Pat. No. 4,521,556, Example 4: 1000 ppm of 1,5-bis-(o-carboxyphenylthio)antrhaquinone (U.S. Pat. No. 4,359,570—Example 1); 360 ppm of 1,5-bis-(o-carboxyanilino) anthraquinone (U.S. Pat. No. 4,359,570—Example 2) and 65 ppm of copper phthalocyanine (Pigment Blue 15). After cooling, the amber polyester was ground using a Wiley mill to pass through a 3 mm screen. A 406 micron (16 mil) film was prepared from a portion of the ground polyester material by compression molding. The UV-visible light transmission of the film is shown in FIG. II, which shows that the formulation provides poor light protection, particularly over the wavelength ranges of about 360–430 nm and 460–550 nm and would not be suitable for packaging materials such as food and drink that are sensitive to UV-visible light over the 300–550 nm range.

The invention has been described in detail with particular reference to preferred embodiments thereof, but it will be understood that variations and modifications can be effected within the spirit and scope of the invention.

We claim:

1. An amber polyester composition comprising a thermoplastic, molding grade polyester containing at least one compound, or the reacted residue of at least one compound, of each of Components I, II, III and, optionally, IV wherein Components I, II and III have the formulas:

Component I Compounds:

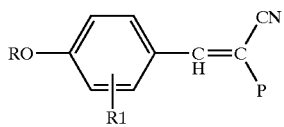

I-A

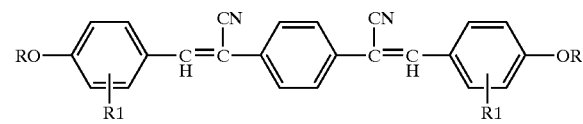

I-B

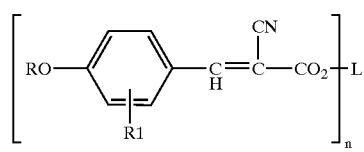

I-C

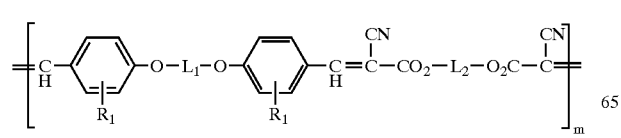

I-D

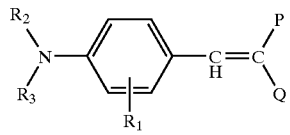

I-E

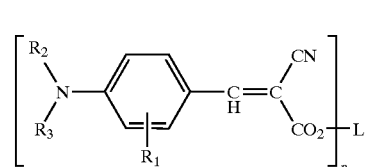

I-F

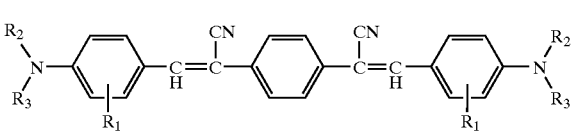

I-G

Component II Compounds:

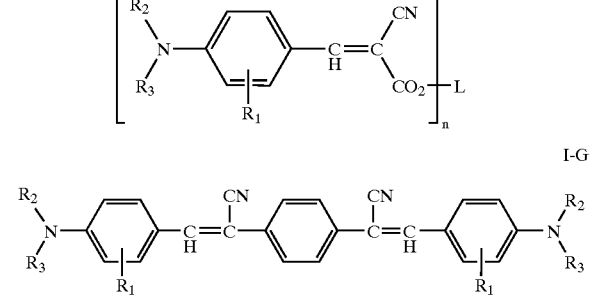

II-A

II-B

II-C

II-D

II-E

II-F

-continued

II-G

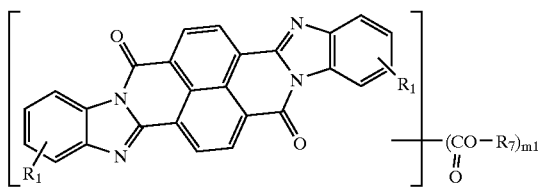

II-H

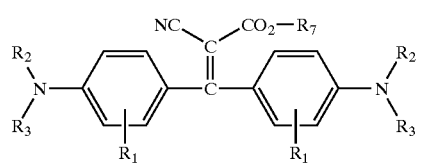

Component III Compounds:

III-A

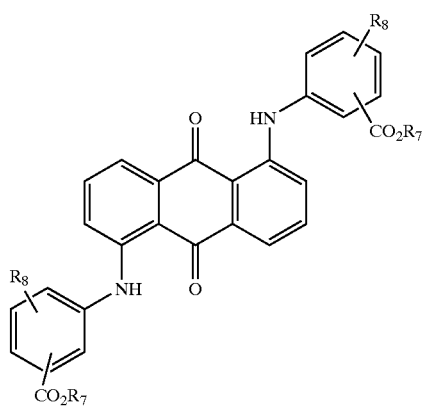

III-B

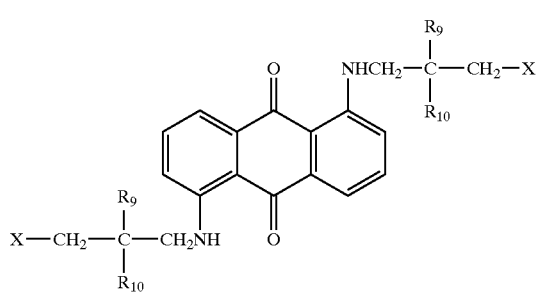

and the Component IV Compound(s) are one or more phthalocyanine compounds; wherein R is hydrogen, $C_1$–$C_8$-alkyl, or —($CH_2CH_2$—O$\overline{)_{n1}}$—$CH_2CH_2$—X wherein n1 is 1–3 and X is a polyester reactive group selected from hydroxy, carboxy, $C_2$–$C_6$-alkanoyloxy and $C_2$–$C_6$-alkoxycarbonyl;

$R_1$ is hydrogen or 1–2 groups selected from $C_1$–$C_6$-alkyl, $C_1$–$C_6$-alkoxy or halogen;

$R_2$ and $R_3$ each is $C_1$–$C_8$-alkyl, $C_3$–$C_8$-alkenyl, $C_3$–$C_8$-alkynyl, $C_3$–$C_8$-cycloalkyl or aryl; $R_2$ and $R_3$ in combination may represent a divalent group such as pentamethylene, ethyleneoxyethylene or ethylenesulfonylethylene; or $R_2$ in combination with $R_1$ may form an N-substituted 1,2,3,4-tetrahydroquinolin-6-yl ring;

$R_4$ is $C_1$–$C_8$-alkyl;

$R_5$ and $R_6$ each is hydrogen or one to two groups selected from $C_1$–$C_6$-alkyl, $C_1$–$C_6$-alkoxy and halogen;

$R_7$ is hydrogen, —(—$CH_2CH_2O$—)$_{n1}$—$CH_2CH_2$—X wherein n1 and X are defined above and $C_1$–$C_6$-alkyl;

$R_8$ is hydrogen or one or two groups selected from $C_1$–$C_6$-alkyl, $C_1$–$C_6$-alkoxy and halogen;

$R_9$ and $R_{10}$ each is hydrogen, $C_1$–$C_6$-alkyl, $C_3$–$C_8$-cycloalkyl or aryl;

P is cyano, $C_1$–$C_6$-alkylsulfonyl, arylsulfonyl, aryl, heteroaryl, —$CO_2R_{11}$ and —$CO_2N(R_{12})R_{13}$, wherein $R_{11}$ is $C_1$–$C_6$-alkyl, $C_3$–$C_8$-alkenyl, $C_3$–$C_8$-cycloalkyl and aryl: $R_{12}$ and $R_{13}$ each is independently selected from hydrogen, $C_1$–$C_6$-alkyl, $C_3$–$C_8$-cycloalkyl, $C_3$–$C_8$-alkenyl and aryl;

Q is one of the groups in the preceding definition of P;

L is an organic di-, tri- or tetravalent linking group;

$L_1$ is an organic divalent linking group;

$L_2$ is an organic divalent linking group;

n is an integer from 1 to 4;

m is an integer from 2 to about 50; and $m_2$ is 0, 1 or 2.

2. A polyester composition according to claim 1 wherein the thermoplastic, molding grade polyester comprises:

(1) diacid residues comprised of at least about 50 mole percent terephthalic acid residues or 2,6-naphthalenedicarboxylic acid residues; and (2) diol or glycol residues comprising at least about 50 mole percent ethylene glycol residues.

3. A polyester composition according to claim 1 wherein the thermoplastic, molding grade polyester comprises:

(1) diacid residues comprised of at least about 85 mole percent terephtlialic acid residues or 2,6-naphthalenedicarboxylic acid residues; and (2) diol residues comprising at least about 85 mole percent ethylene glycol residues;

and the individual Component I, II and III compounds or the copolymerized or reacted residue thereof are present in concentrations of about 50 to 20,000 ppm and the total concentration of the Component I, II and III compounds or the copolymerized or reacted residue thereof is about 200 to 25,000 ppm.

4. A thermoplastic, amber, molding composition according to claim 1 comprising a polyester having an inherent viscosity of about 0.6 to 0.9 dL/g comprising:

(1) diacid residues comprised of at least about 85 mole percent terephthalic acid residues, 2,6-naphthalenedicarboxylic acid residues, or a mixture of terephthalic acid and 2,6-naphthalenedicarboxylic acid residues;

(2) diol residues comprising at least about 50 mole percent, preferably at least 85 mole percent, ethylene glycol residues;

wherein (i) the polyester has copolymerized therein or reacted therewith the residues of at least one compound of Components I, II, and III with the provision that the compounds of Components I, II, and III contain at least one polyester reactive group; or (ii) the polyester has admixed therein at least one compound of Components I, II, and III with the provision that the compounds of Components I, II, and III have molecular weights of at least about 450;

wherein the compounds of Components I, II, and III or the reacted residues thereof are present in the polyester composition in concentrations that will cause a film of the polyester composition having a thickness of about 25 to 1016 microns (about 1 to 40 mil) to transmit (i) no more than an average of about 3% of ultraviolet and visible light over the wavelength range from about 350 to 450 nm, (ii) no more visible light than an average of about 7% over the wavelength range from about 450 to 500 nm and (iii) no more visible light than an average of about 15% over the range of about 500 to 550 nm; and optionally, wherein about 50–300 ppm of a phthalocyanine blue colorant is admixed in the thermoplastic polyester.

5. A thermoplastic, amber, molding composition comprising a polyester having an inherent viscosity of about 0.6 to 0.9 dL/g comprising:

(1) diacid residues comprised of at least about 85 mole percent terephthalic acid residues, 2,6-naphthalenedicarboxylic acid residues, or a mixture of terephthalic acid and 2,6-naphthalenedicarboxylic acid residues; and (2) diol residues comprising at least about 50 mole percent, preferably at least 85 mole percent, ethylene glycol residues;

wherein the polyester contains at least one compound, or the reacted residue of at least one compound, of each of Components I, II and III wherein Components I, II and III have the formulas:

Component I Compounds:

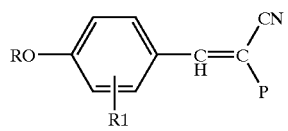
I-A wherein R is hydrogen, methyl, 2-hydroxyethyl, 2-acetoxyethyl or 4-(methoxycarbonyl)benzyl; $R_1$ is hydrogen or methoxy; and P is cyano, methoxycarbonyl, methylsulfonyl or arylsulfonyl wherein aryl is phenyl or tolyl;

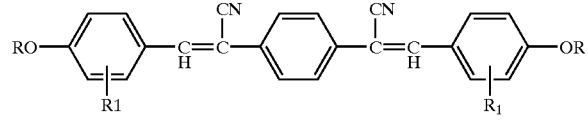
I-B wherein R is hydrogen, methyl, 2-hydroxyethyl, 2-acetoxyethyl, or 4-(methoxycarbonyl)benzyl; $R_1$ is hydrogen or methoxy; and P is cyano, methoxycarbonyl, methylsulfonyl or arylsulfonyl wherein aryl is phenyl or tolyl;

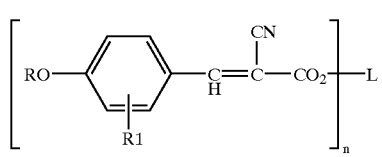
I-C wherein R is hydrogen, methyl, 2-hydroxyethyl, 2-acetoxyethyl, or 4-(methoxycarbonyl)benzyl; $R_1$ is hydrogen or methoxy; and L is ethylene, tetramethylene, or 1,4-cyclohexylenedimethylene and n is 2 or L is $C-(CH_2)-$ and n is 4;

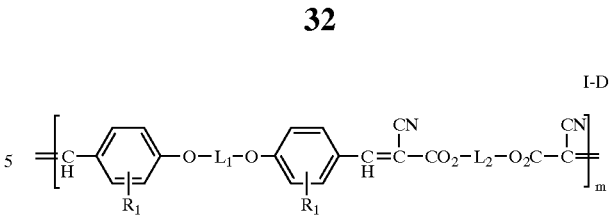
I-D wherein $R_1$ is hydrogen or methoxy; and $L_1$ and $L_2$ are each ethylene, tetramethylene or 1,4-cyclohexylenedimethylene; and m is about 3 to 25;

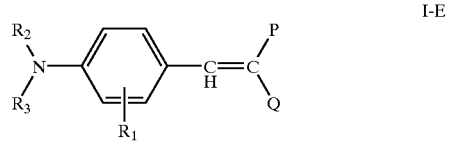
I-E wherein $R_1$ is hydrogen, methyl or methoxy; $R_2$ and $R_3$ are independently selected from methyl, ethyl, 2-hydroxyethyl, 2-acetoxyethyl, 2-chloroethyl, 2-cyanoethyl, cyclohexyl, phenyl, benzyl, and 4-(methoxycarbonyl)benzyl; and P and Q are independently selected from cyano, methoxycarbonyl, ethoxycarbonyl, methylsulfonyl and arylsulfonyl wherein aryl is phenyl or tolyl;

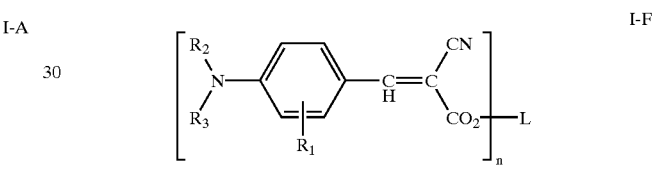
I-F wherein $R_1$ is hydrogen, methyl or methoxy; $R_2$ and $R_3$ are independently selected from methyl, ethyl, 2-hydroxyethyl, 2-acetoxyethyl, 2-chloroethyl, 2-cyanoethyl, cyclohexyl, phenyl, benzyl, and 4-(methoxycarbonyl)benzyl; and L is ethylene, tetramethylene or 1,4-cyclohexylenedimethylene and n is 2 or L is $C-(CH_2)-$ and n is 4;

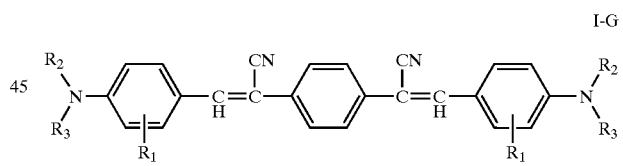
I-G wherein $R_1$ is hydrogen, methyl or methoxy; and $R_2$ and $R_3$ are independently selected from methyl, ethyl, 2-hydroxyethyl, 2-acetoxyethyl, 2-chloroethyl, 2-cyanoethyl, cyclohexyl, phenyl, benzyl, and 4-(methoxycarbonyl)benzyl;

Component II Compounds:

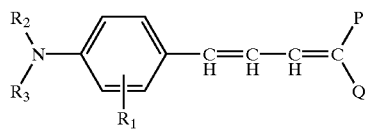
II-A wherein $R_1$ is hydrogen, methyl or methoxy; $R_2$ and $R_3$ are independently selected from methyl, ethyl, 2-hydroxyethyl, 2-acetoxyethyl, 2-chloroethyl, 2-cyanoethyl, cyclohexyl, phenyl, benzyl, and 1-(methoxycarbonyl)benzyl; and P and Q are independently selected from cyano, methoxycarbonyl, ethoxycarbonyl, methylsulfonyl and arylsulfonyl wherein aryl is phenyl or tolyl;

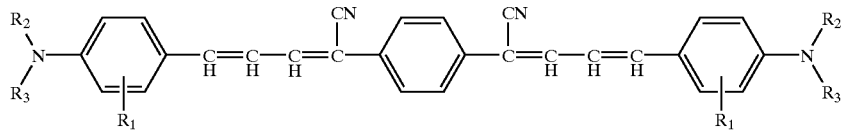

II-B wherein $R_1$ is hydrogen, methyl or methoxy; and $R_2$ and $R_3$ are independently selected from methyl, ethyl, 2-hydroxyethyl, 2-acetoxyethyl, 2-chloroethyl, 2-cyanoethyl, cyclohexyl, phenyl, benzyl, and 4-(methoxycarbonyl)benzyl;

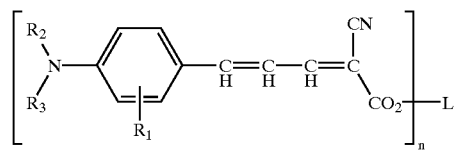

II-C wherein $R_1$ is hydrogen, methyl or methoxy; $R_2$ and $R_3$ are independently selected from methyl, ethyl, 2-hydroxyethyl, 2-acetoxyethyl, 2-chloroethyl, 2-cyanoethyl, cyclohexyl, phenyl, benzyl, and 4-(methoxycarbonyl)benzyl; and L is ethylene, tetramethylene or 1,4-cyclohexylenedimethylene and n is 2 or L is C—(CH$_2$)— and n is 4;

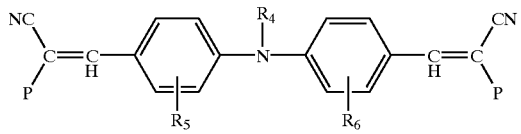

II-D wherein $R_4$ is $C_1$–$C_4$-alkyl, 2-hydroxyethyl or 2-acetoxyethyl; $R_5$ and $R_6$ are each hydrogen; and P is $C_2$–$C_7$-alkoxycarbonyl;

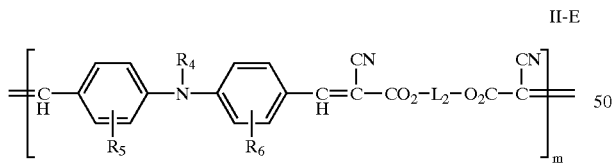

II-E wherein $R_4$ is $C_1$–$C_4$ alkyl, 2-hydroxyethyl or 2-acetoxyethyl; $R_5$ and $R_6$ are each hydrogen; $L_2$ is ethylene, tetramethylene or 1,4-cyclohexylenedimethylene; and m is about 3 to 25;

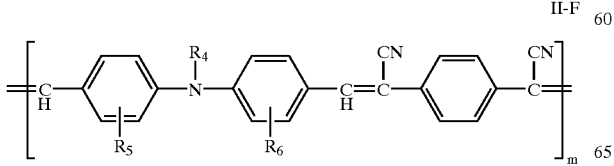

II-F wherein $R_4$ is $C_1$–$C_4$ alkyl, 2-hydroxyethyl or 2-acetoxyethyl; $R_5$ and $R_6$ are each hydrogen; and m is about 3 to 25;

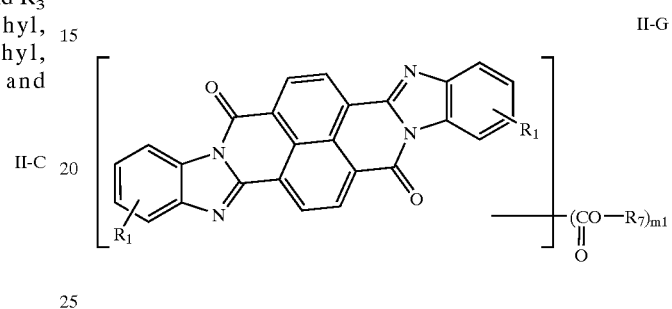

II-G wherein each $R_1$ is hydrogen, $R_7$ is hydrogen, methyl or 2-hydroxyethyl and m1 is 1 or 2;

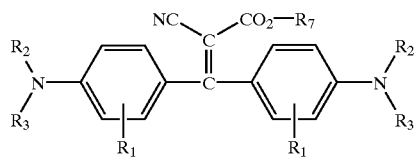

II-H wherein each $R_1$ is hydrogen, $R_7$ is methyl, ethyl or 2-hydroxyethyl; and $R_2$ and $R_3$ are independently selected from methyl, ethyl, 2-hydroxyethyl, 2-acetoxyethyl, 2-chloroethyl, 2-cyanoethyl, cyclohexyl, phenyl, benzyl, and 4-(methoxycarbonyl)-benzyl;

Component III Compounds:

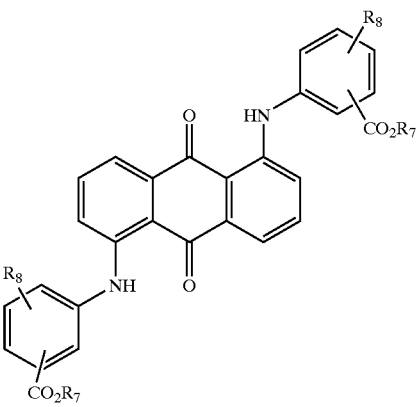

III-A wherein $R_8$ is hydrogen, methyl or chloro and $R_7$ is hydrogen, methyl or 2-hydroxyethyl;

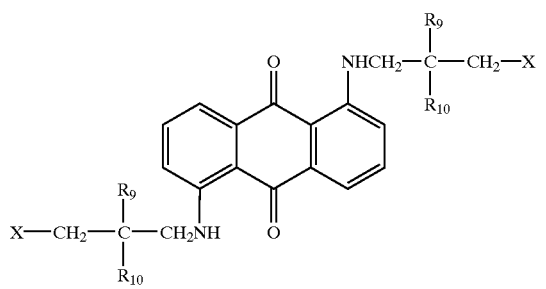
III-B wherein $R_9$ and $R_{10}$ are independently selected from hydrogen and methyl and X is hydroxy, acetoxy, carboxyl, methoxycarbonyl or ethoxycarbonyl.

6. A thermoplastic, amber, molding composition according to claim 5 wherein light absorbing compounds Components I, II, and III or the reacted residues thereof are present in the polyester composition in concentrations that will cause a film of the polyester composition having a thickness of about 76 to 432 microns (about 3 to 17 mil) to transmit (i) no more than an average of about 1% of ultraviolet and visible light over the wavelength range from about 300 to 450 nm, (ii) no more visible light than an average of about 3% over the wavelength range from about 450 to 500 nm wavelength range and (iii) no more visible light than an average of about 10% over the range of about 500 to 550 nm.

7. A thermoplastic, amber, molding composition according to claim 5 wherein one or two Component I compounds or reacted residue(s) thereof, is/are present in concentrations of about 100 to 2,000 ppm; at least one Component II compound or reacted residue thereof is present at a concentration of about 100 to 5,000 ppm; and at least one Component III compound or reacted residue thereof is present in a concentration of about 150 to 2,500 ppm in the polyester composition.

8. A thermoplastic, amber, molding composition according to claim 5 wherein the polyester composition contains 100 to 5,000 ppm of at least one colorant of Formula II-F or the reacted residues thereof; 100 to 2,000 ppm of at least one of the Component I compounds or reacted residue thereof; 150 to 2,500 ppm of at least one of the Component III compound or reacted residue thereof, and 50 to 300 ppm of copper phthalocyanine.

9. A thermoplastic, amber, molding composition comprising a polyester having an inherent viscosity of about 0.6 to 0.9 dL/g comprising:
(1) diacid residues comprised of at least about 85 mole percent terephthalic acid residues, 2,6-naphthalenedicarboxylic acid residues, or a mixture of terephthalic acid and 2,6-naphthalenedicarboxylic acid residues; and
(2) diol residues comprising at least about 50 mole percent, preferably at least 85 mole percent, ethylene glycol residues;
wherein the polyester contains 500 to 6000 ppm of a compound, or the reacted residue of a compound, having the formula:

wherein $R_1$ is hydrogen, methyl or methoxy; and $R_2$ and $R_3$ are independently selected from methyl, ethyl, 2-hydroxyethyl, 2-acetoxyethyl, 2-chloroethyl, 2-cyanoethyl, cyclohexyl, phenyl, benzyl, and 4-(methoxycarbonyl)benzyl; and 50 to 300 ppm copper phthalocyanine.

10. A thermoplastic, amber, molding composition according to claim 5 wherein the light absorbing compounds, or the reacted residues thereof, comprise (i) the compound of formula I-E wherein $R_1$ is hydrogen, $R_2$ and $R_3$ each is methyl, and P and Q each is ethoxycarbonyl; (ii) the compound of formula II-F wherein $R_4$ is methyl, $R_5$ and $R_6$ each is hydrogen, and m is about 3 to 25; (iii) the compound of formula III-B wherein $R_9$ and $R_{10}$ each is hydrogen and X is hydroxyl; and (iv) 50 to 300 ppm copper phthalocyanine;
wherein light absorbing compounds (i), (ii) and (iii), or the reacted residues thereof, are present in concentrations of 100 to 5000 ppm and the total concentration of light absorbing compounds (i), (ii) and (iii), or the reacted residues thereof, is about 500 to 15,000 ppm.

11. A thermoplastic, amber, molding composition according to claim 5 wherein the light absorbing compounds, or the reacted residues thereof, comprise (i) the compound of formula I-A wherein R is hydrogen $R_1$ is methoxy, and P is methoxycarbonyl; (ii) the compound of formula II-F wherein $R_4$ is methyl, $R_5$ and $R_6$ each is hydrogen, and m is about 3 to 25; (iii) the compound of formula III-B wherein $R_9$ and $R_{10}$ each is hydrogen and X is hydroxyl; and (iv) 50 to 300 ppm copper phthalocyanine;
wherein light absorbing compounds (i), (ii) and (iii), or the reacted residues thereof, are present in concentrations of 100 to 5000 ppm and the total concentration of light absorbing compounds (i), (ii) and (iii), or the reacted residues thereof, is about 500 to 15,000 ppm.

12. A thermoplastic, amber, molding composition according to claim 5 wherein the light absorbing compounds, or the reacted residues thereof, comprise (i) the compound of formula I-E wherein $R_1$ is hydrogen, $R_2$ and $R_3$ each is methyl, and P and Q each is ethoxycarbonyl; (ii) the compound of formula II-C wherein $R_1$ is hydrogen, $R_2$ and $R_3$ each is methyl, and L is ethylene; (iii) the compound of formula III-A wherein each $R_7$ and each $R_8$ is hydrogen; and (iv) 50 to 300 ppm copper phthalocyanine;
wherein light absorbing compounds (i), (ii) and (iii), or the reacted residues thereof, are present in concentrations of 100 to 5000 ppm and the total concentration of light absorbing compounds (i), (ii) and (iii), or the reacted residues thereof, is about 500 to 15,000 ppm.

13. A thermoplastic, amber, molding composition according to claim 5 wherein the light absorbing compounds, or the reacted residues thereof, comprise (i) the compound of formula I-E wherein $R_1$ is hydrogen, $R_2$ and $R_3$ each is methyl, and P and Q each is ethoxycarbonyl; (ii) the compound of formula I-E wherein $R_1$ is methyl, $R_2$ and $R_3$ each

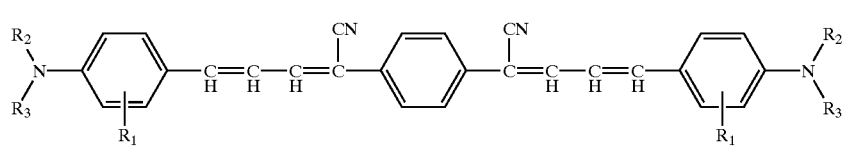
II-B is 2-acetoxyethyl, and P is cyano, and Q each is methoxycarbonyl; (iii) the compound of formula II-C wherein $R_1$ is hydrogen, $R_2$ and $R_3$ each is methyl, and L is ethylene; (iv) the compound of formula II-A wherein each $R_7$ and each $R_8$ is hydrogen; and (v) 50 to 300 ppm copper phthalocyanine; wherein light absorbing compounds (i), (ii), (iii) and (iv), or the reacted residues thereof, are present in concentrations of 100 to 5000 ppm and the total concentration of light absorbing compounds (i), (ii), (iii) and (iv), or the reacted residues thereof, is about 500 to 15,000 ppm.

14. A thermoplastic, amber, molding composition according to claim 5 wherein the light absorbing compounds, or the reacted residues thereof, comprise (i) the compound of formula I-A wherein R is hydrogen $R_1$ is methoxy, and P is methoxycarbonyl; (ii) the compound of formula II-D wherein $R_4$ is ethyl, $R_5$ and $R_6$ each is hydrogen, and P is methoxycarbonyl; (iii) the compound of formula III-A wherein each $R_7$ and each $R_8$ is hydrogen; and (iv) 50 to 300 ppm copper phthalocyanine;
wherein light absorbing compounds (i), (ii) and (iii), or the reacted residues thereof, are present in concentrations of 100 to 5000 ppm and the total concentration of light absorbing compounds (i), (ii) and (iii), or the reacted residues thereof, is about 500 to 15,000 ppm.

15. A thermoplastic, amber, molding composition according to claim 5 wherein the light absorbing compounds, or the reacted residues thereof, comprise (i) the compound of formula I-E wherein $R_1$ is hydrogen, $R_2$ and $R_3$ each is methyl, and P and Q each is ethoxycarbonyl; (ii) the compound of formula II-E wherein $R_4$ is methyl, $R_5$ and $R_6$ each is hydrogen, L is ethylene, and m is about 3 to 25; (iii) the compound of formula III-B wherein $R_9$ and $R_{10}$ each is hydrogen and X is hydroxyl; and (iv) 50 to 300 ppm copper phthalocyanine;
wherein light absorbing compounds (i), (ii) and (iii), or the reacted residues thereof, are present in concentrations of 100 to 5000 ppm and the total concentration of light absorbing compounds (i), (ii) and (iii), or the reacted residues thereof, is about 500 to 15,000 ppm.

16. A thermoplastic, amber, molding composition according to claim 5 wherein the light absorbing compounds, or the reacted residues thereof, comprise (i) the compound of formula I-E wherein $R_1$ is hydrogen, $R_2$ and $R_3$ each is methyl, and P and Q each is ethoxycarbonyl; (ii) the compound of formula II-B wherein $R_1$ is hydrogen and $R_2$ and $R_3$ each is methyl; (iii) the compound of formula III-B wherein $R_9$ and $R_{10}$ each is hydrogen and X is hydroxyl; and (iv) 50 to 300 ppm copper phthalocyanine;
wherein light absorbing compounds (i), (ii) and (iii), or the reacted residues thereof, are present in concentrations of 100 to 5000 ppm and the total concentration of light absorbing compounds (i), (ii) and (iii), or the reacted residues thereof, is about 500 to 15,000 ppm.

17. A thermoplastic, amber, molding composition according to claim 5 wherein the light absorbing compounds, or the reacted residues thereof, comprise (i) the compound of formula I-A wherein R is hydrogen $R_1$ is methoxy, and P is methoxycarbonyl; (ii) the compound of formula I-E wherein $R_1$ is methyl, $R_2$ and $R_3$ each is 2-acetoxyethyl, and P is cyano, and Q each is methoxycarbonyl; (iii) the compound of formula II-G wherein $R_1$ is hydrogen, $R_7$ is hydrogen, and m1 is 2; (iv) the compound of formula II-A wherein each $R_7$ and each $R_8$ is hydrogen; and (v) 50 to 300 ppm copper phthalocyanine;
wherein light absorbing compounds (i), (ii), (iii) and (iv), or the reacted residues thereof, are present in concentrations of 100 to 5000 ppm and the total concentration of light absorbing compounds (i), (ii), (iii) and (iv), or the reacted residues thereof, is about 500 to 15,000 ppm.

18. A thermoplastic, amber, molding composition according to claim 5 wherein the light absorbing compounds, or the reacted residues thereof, comprise (i) the compound of formula I-E wherein $R_1$ is hydrogen, $R_2$ and $R_3$ each is methyl, and P and Q each is ethoxycarbonyl; (ii) the compound of formula II-A wherein $R_1$ is hydrogen, $R_2$ and $R_3$ each is methyl, and P and Q each is ethoxycarbonyl; (iii) the compound of formula III-A wherein each $R_7$ and each $R_8$ is hydrogen; and (iv) 50 to 300 ppm copper phthalocyanine;
wherein light absorbing compounds (i), (ii) and (iii), or the reacted residues thereof, are present in concentrations of 100 to 5000 ppm and the total concentration of light absorbing compounds (i), (ii) and (iii), or the reacted residues thereof, is about 500 to 15,000 ppm.

19. A thermoplastic, amber, molding composition according to claim 5 wherein the light absorbing compounds, or the reacted residues thereof, comprise (i) the compound of formula I-E wherein $R_1$ is hydrogen, $R_2$ and $R_3$ each is methyl, and P and Q each is ethoxycarbonyl; (ii) the compound of formula II-H wherein $R_1$ is hydrogen, $R_2$ and $R_3$ each is methyl, and $R_7$ is ethyl; (iii) and the compound of formula III-A wherein each $R_7$ and each $R_8$ is hydrogen; (iv) 50 to 300 ppm copper phthalocyanine;
wherein light absorbing compounds (i), (ii) and (iii), or the reacted residues thereof, are present in concentrations of 100 to 5000 ppm and the total concentration of light absorbing compounds (i), (ii) and (iii), or the reacted residues thereof, is about 500 to 15,000 ppm.

20. A polyester concentrate of light absorbing compounds comprising a polyester having an inherent viscosity of about 0.6 to 0.9 dL/g comprising:
(1) diacid residues comprised of at least about 85 mole percent terephthalic acid residues, 2,6-naphthalenedicarboxylic acid residues, or a mixture of terephthalic acid and 2,6-naphthalenedicarboxylic acid residues; and
(2) diol residues comprising at least about 50 mole percent, preferably at least 85 mole percent, ethylene glycol residues;
wherein the polyester contains at least one compound, or the reacted residue of at least one compound, of each of Components I, II and III wherein Components I, II and III have the formulas:

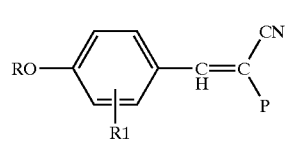

wherein R is hydrogen, methyl, 2-hydroxyethyl, 2-acetoxyethyl or 4-(methoxycarbonyl)benzyl; $R_1$ is hydrogen or methoxy; and P is cyano, methoxycarbonyl, methylsulfonyl or arylsulfonyl wherein aryl is phenyl or tolyl;

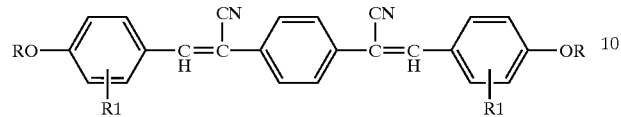

I-B wherein R is hydrogen, methyl, 2-hydroxyethyl, 2-acetoxyethyl, or 4-(methoxycarbonyl)benzyl; $R_1$ is hydrogen or methoxy; and P is cyano, methoxycarbonyl, methylsulfonyl or arylsulfonyl wherein aryl is phenyl or tolyl;

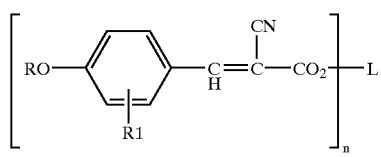

I-C wherein R is hydrogen, methyl, 2-hydroxyethyl, 2-acetoxyethyl, or 4-(methoxycarbonyl)benzyl; $R_1$ is hydrogen or methoxy; and L is ethylene, tetramethylene, or 1,4-cyclohexylenedimethylene and n is 2 or L is C—(CH$_2$)— and n is 4;

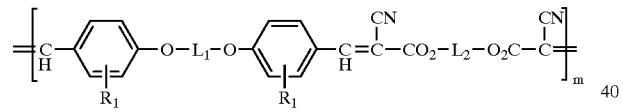

I-D wherein $R_1$ is hydrogen or methoxy; and $L_1$ and $L_2$ are each ethylene, tetramethylene or 1,4-cyclohexylenedimethylene; and m is about 3 to 25;

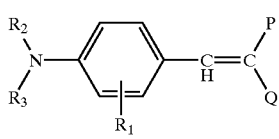

I-E wherein $R_1$ is hydrogen, methyl or methoxy; $R_2$ and $R_3$ are independently selected from methyl, ethyl, 2-hydroxyethyl, 2-acetoxyethyl, 2-chloroethyl, 2-cyanoethyl, cyclohexyl, phenyl, benzyl, and 4-(methoxycarbonyl)benzyl; and P and Q are independently selected from cyano, methoxycarbonyl, ethoxycarbonyl, methylsulfonyl and arylsulfonyl wherein aryl is phenyl or tolyl;

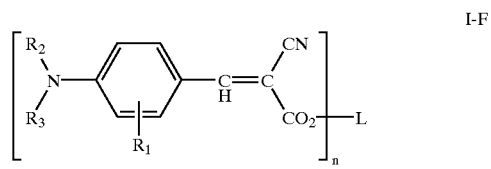

I-F wherein $R_1$ is hydrogen, methyl or methoxy; $R_2$ and $R_3$ are independently selected from methyl, ethyl, 2-hydroxyethyl, 2-acetoxyethyl, 2-chloroethyl, 2-cyanoethyl, cyclohexyl, phenyl, benzyl, and 4-(methoxycarbonyl)benzyl; and L is ethylene, tetramethylene or 1,4-cyclohexylenedimethylene and n is 2 or L is C—(CH$_2$)— and n is 4;

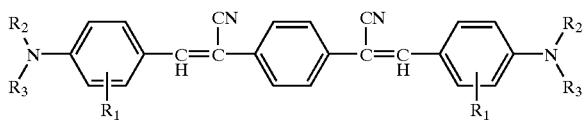

I-G wherein $R_1$ is hydrogen, methyl or methoxy; and $R_2$ and $R_3$ are independently selected from methyl, ethyl, 2-hydroxyethyl, 2-acetoxyethyl, 2-chloroethyl, 2-cyanoethyl, cyclohexyl, phenyl, benzyl, and 4-(methoxycarbonyl)benzyl;

Component II Compounds:

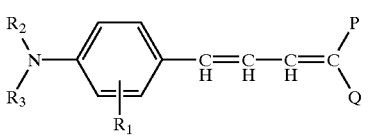

II-A wherein $R_1$ is hydrogen, methyl or methoxy; $R_2$ and $R_3$ are independently selected from methyl, ethyl, 2-hydroxyethyl, 2-acetoxyethyl, 2-chloroethyl, 2-cyanoethyl, cyclohexyl, phenyl, benzyl, and 4-(methoxycarbonyl)benzyl; and P and Q are independently selected from cyano, methoxycarbonyl, ethoxycarbonyl, methylsulfonyl and arylsulfonyl wherein aryl is phenyl or tolyl;

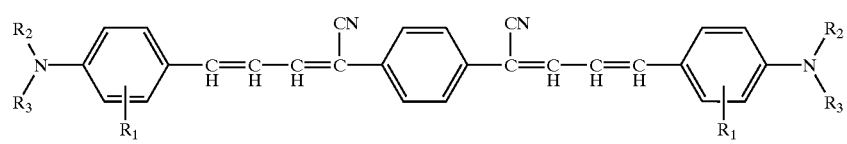

II-B wherein $R_1$ is hydrogen, methyl or methoxy; and $R_2$ and $R_3$ are independently selected from methyl, ethyl, 2-hydroxyethyl, 2-acetoxyethyl, 2-chloroethyl, 2-cyanoethyl, cyclohexyl, phenyl, benzyl, and 4-(methoxycarbonyl)benzyl;

II-C

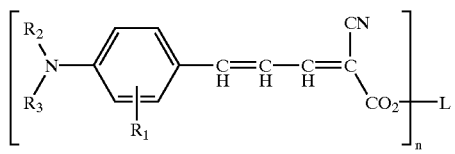

wherein $R_1$ is hydrogen, methyl or methoxy; $R_2$ and $R_3$ are independently selected from methyl, ethyl, 2-hydroxyethyl, 2-acetoxyethyl, 2-chloroethyl, 2-cyanoethyl, cyclohexyl, phenyl, benzyl, and 4-(methoxycarbonyl)benzyl; and L is ethylene, tetramethylene or 1,4-cyclohexylenedimethylene and n is 2 or L is C—(CH$_2$)— and n is 4;

II-D

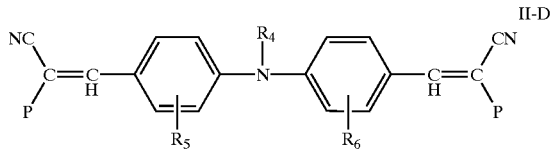

wherein $R_4$ is $C_1$–$C_4$ alkyl, 2-hydroxyethyl or 2-acetoxyethyl; $R_5$ and $R_6$ are each hydrogen; and P is $C_2$–$C_7$-alkoxycarbonyl;

II-E

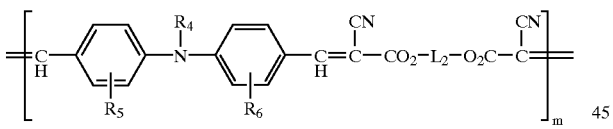

wherein $R_4$ is $C_1$–$C_4$ alkyl, 2-hydroxyethyl or 2-acetoxyethyl; $R_5$ and $R_6$ are each hydrogen; $L_2$ is ethylene, tetramethylene or 1,4-cyclohexylenedimethylene; and m is about 3 to 25;

II-F

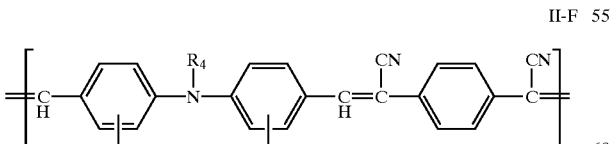

wherein $R_4$ is $C_1$–$C_4$ alkyl, 2-hydroxyethyl or 2-acetoxyethyl; $R_5$ and $R_6$ are each hydrogen; and m is about 3 to 25;

II-G

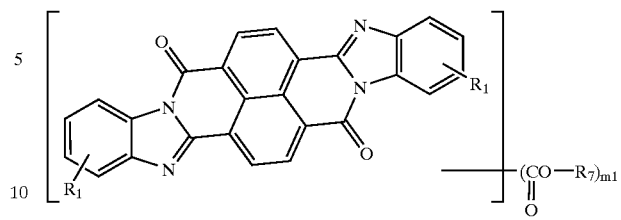

wherein each $R_1$ is hydrogen, $R_7$ is hydrogen, methyl or 2-hydroxyethyl and m1 is 1 or 2;

II-H

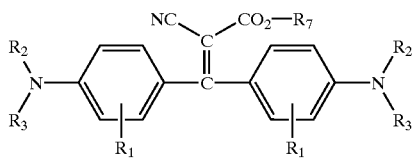

wherein each $R_1$ is hydrogen, $R_7$ is methyl, ethyl or 2-hydroxyethyl; and $R_2$ and $R_3$ are independently selected from methyl, ethyl, 2-hydroxyethyl, 2-acetoxyethyl, 2-chloroethyl, 2-cyanoethyl, cyclohexyl, phenyl, benzyl, and 4-(methoxycarbonyl)-benzyl;

Component III Compounds:

III-A

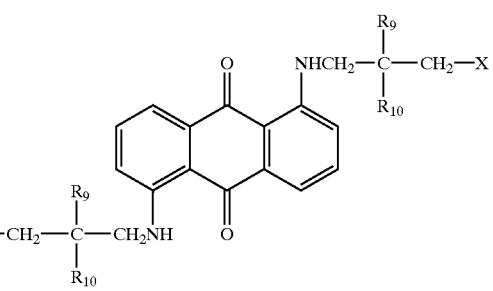

wherein $R_8$ is hydrogen, methyl or chloro and $R_7$ is hydrogen, methyl or 2-hydroxyethyl;

III-B wherein $R_9$ and $R_{10}$ are independently selected from hydrogen and methyl and X is hydroxy, acetoxy, carboxyl, methoxycarbonyl or ethoxycarbonyl, wherein the concentration of the individual light-absorbing compounds of Components I, II, and III present in the polyester is in the range of about 0.5 to 30 weight percent and the maximum total concentration of all light-absorbing compounds of Components I, II, and III is about 50 weight percent, based on the total weight of the polyester concentrate.

21. A polyester concentrate according to claim 20 wherein the concentration of the individual light-absorbing compounds of Components I, II, and III present in the polyester is in the range of about 0.5 to 10 weight percent and the maximum total concentration of all light-absorbing compounds of Components I, II, and III is about 30 weight percent, based on the total weight of the polyester concentrate.

22. A polyester concentrate comprising a polyester having an inherent viscosity of about 0.6 to 0.9 dL/g comprising:

(1) diacid residues comprised of at least about 85 mole percent terephthalic acid residues, 2,6-naphthalenedicarboxylic acid residues, or a mixture of terephthalic acid and 2,6-naphthalenedicarboxylic acid residues; and (2) diol residues comprising at least about 50 mole percent, preferably at least 85 mole percent, ethylene glycol residues;

wherein the polyester contains 0.5 to 30 weight percent, based on the total weight of the polyester concentrate, of at least one compound, or the reacted residue of at least one compound, of having formula II-B:

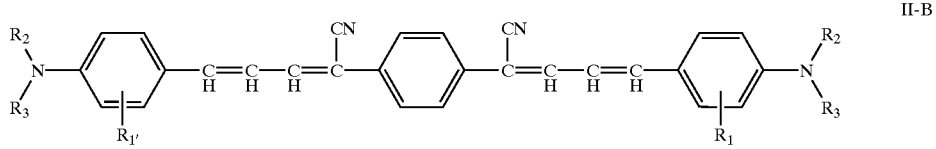

II-B wherein $R_1$ is hydrogen, methyl or methoxy; and $R_2$ and $R_3$ are independently selected from methyl, ethyl, 2-hydroxyethyl, 2-acetoxyethyl, 2-chloroethyl, 2-cyanoethyl, cyclohexyl, phenyl, benzyl, and 4-(methoxycarbonyl)benzyl.

23. A polyester concentrate according to claim 22 wherein the polyester contains at least one compound, or the reacted residue of at least one compound, having formula II-B and a phthalocycanine compound wherein the concentration of the individual light-absorbing compounds comprising a compound of formula II-B and a phthalocycanine compound in the polyester is in the range of about 0.5 to 30 weight percent and the maximum total concentration of the formula II-B compound and the phthalocycanine compound is about 50 weight percent, based on the total weight of the polyester concentrate.

24. A polyester concentrate according to claim 22 wherein the polyester contains at least one compound, or the reacted residue of at least one compound, having formula II-B and copper phthalocycanine wherein the concentration of the individual light-absorbing compounds comprising a compound of formula II-B and the copper phthalocycanine in the polyester is in the range of about 0.5 to 10 weight percent and the maximum total concentration of the formula II-B compound and copper phthalocycanine is about 15 weight percent, based on the total weight of the polyester concentrate.

* * * * *

UNITED STATES PATENT AND TRADEMARK OFFICE
CERTIFICATE OF CORRECTION

PATENT NO. : 6,787,589 B2
APPLICATION NO. : 10/284592
DATED : September 7, 2004
INVENTOR(S) : Weaver et al.

It is certified that error appears in the above-identified patent and that said Letters Patent is hereby corrected as shown below:

Column 30, line 20 "$m_2$" should be --$m_1$--

Column 32, line 67 "1-(methoxycarbonyl)benzyl" should be -- 4-methoxycarbonyl)benzyl--

Column 37, line 4 "formula II-A" should be --formula III-A --

Column 38, line 1 "formula II-a" should be --formula III-A --

Signed and Sealed this

Eighteenth Day of September, 2007

JON W. DUDAS
*Director of the United States Patent and Trademark Office*